United States Patent
Onishi et al.

(10) Patent No.: US 6,963,176 B2
(45) Date of Patent: Nov. 8, 2005

(54) DISCHARGE LAMP OPERATION APPARATUS

(75) Inventors: Naoki Onishi, Hirakata (JP); Shigeru Ido, Shijonawate (JP); Yoshinobu Murakami, Hirakata (JP); Minoru Yamamoto, Hirakata (JP)

(73) Assignee: Matsushita Electric Works, Ltd., Osaka (JP)

( * ) Notice: Subject to any disclaimer, the term of this patent is extended or adjusted under 35 U.S.C. 154(b) by 35 days.

(21) Appl. No.: 10/478,698

(22) PCT Filed: Dec. 20, 2002

(86) PCT No.: PCT/JP02/13340

§ 371 (c)(1),
(2), (4) Date: Mar. 11, 2004

(87) PCT Pub. No.: WO03/056887

PCT Pub. Date: Jul. 10, 2003

(65) Prior Publication Data

US 2004/0160152 A1 Aug. 19, 2004

(30) Foreign Application Priority Data

Dec. 25, 2001 (JP) ............................ 2001-390734
Jan. 28, 2002 (JP) ............................ 2002-017783
Jan. 28, 2002 (JP) ............................ 2002-017789

(51) Int. Cl.[7] .................... H05B 37/02; H05E 37/02

(52) U.S. Cl. .................. 315/291; 315/209 R; 315/219; 315/308; 315/224; 315/DIG. 4; 315/DIG. 5

(58) Field of Search ................................ 315/291, 224, 315/209 R, 308, 219, 307, 247, 269, 174, 315/DIG. 4, DIG. 5, DIG. 7

(56) References Cited

U.S. PATENT DOCUMENTS

| | | | | |
|---|---|---|---|---|
| 5,416,387 A | * | 5/1995 | Cuk et al. ............... | 315/209 R |
| 5,493,182 A | | 2/1996 | Sowa et al. ................. | 315/291 |
| 5,502,423 A | * | 3/1996 | Okude et al. ............... | 315/291 |
| 5,565,740 A | * | 10/1996 | Hiramatsu et al. ...... | 315/209 R |
| 6,448,720 B1 | | 9/2002 | Sun ............................. | 315/219 |
| 6,518,712 B2 | | 2/2003 | Weng ..................... | 315/209 R |
| 6,593,703 B2 | | 7/2003 | Sun ............................. | 315/224 |
| 2004/0183473 A1 | * | 9/2004 | Kamoi et al. ............... | 315/291 |

FOREIGN PATENT DOCUMENTS

EP            0439864          8/1991

(Continued)

OTHER PUBLICATIONS

English Language Abstract of JP 7-6889.

(Continued)

*Primary Examiner*—Don Wong
*Assistant Examiner*—Chuc Tran
(74) *Attorney, Agent, or Firm*—Greenblum & Bernstein, P.L.C.

(57) ABSTRACT

A discharge lamp operation apparatus includes an AC power supply (10), a voltage converting circuit (11), an inverter circuit (13), a load circuit (15), a controller (1), and a pulse voltage superimposing section (3). The pulse voltage superimposing section (3) controls the switching elements (Q3, Q4) of the inverter circuit (13) to superimpose a pulse voltage to the voltage applied across the discharge lamp (LA). The period until the discharge lamp (LA) is lighted is divided into a preheating period to preheat the discharge lamp and a startup period to start the discharge lamp. During the startup period, the controller (1) raises gradually the output voltage (Vdc) of the voltage converting circuit (11), and the voltage superimposing section (3) superimposes the pulse voltage on the voltage applied across the discharge lamp (LA).

31 Claims, 23 Drawing Sheets

FOREIGN PATENT DOCUMENTS

| | | |
|---|---|---|
| JP | 58204496 | 11/1983 |
| JP | 1-167998 | 7/1989 |
| JP | 2-126598 | 5/1990 |
| JP | 3-115938 | 5/1991 |
| JP | 4-212298 | 8/1992 |
| JP | 4-253195 | 9/1992 |
| JP | 5-190291 | 7/1993 |
| JP | 7-6889 | 1/1995 |

OTHER PUBLICATIONS

English Language Abstract of JP 1-167998.
English Language Abstract of JP 5-190291.
English Language Abstract of JP 2-126598.
English Language Abstract of JP 4-253195.
English Language Abstract of JP 4-212298.
English Language Abstract of JP 3-115938.

* cited by examiner

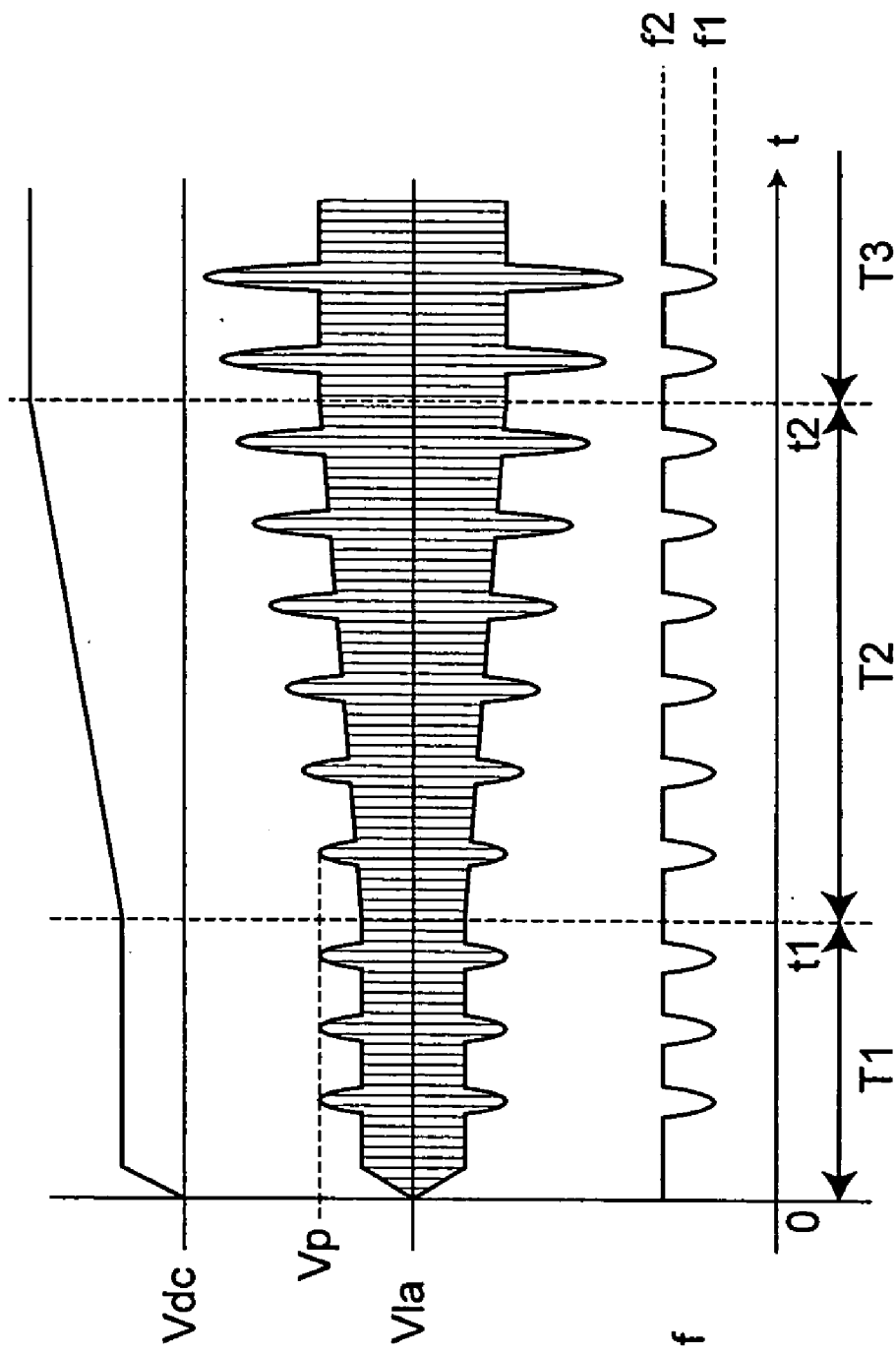

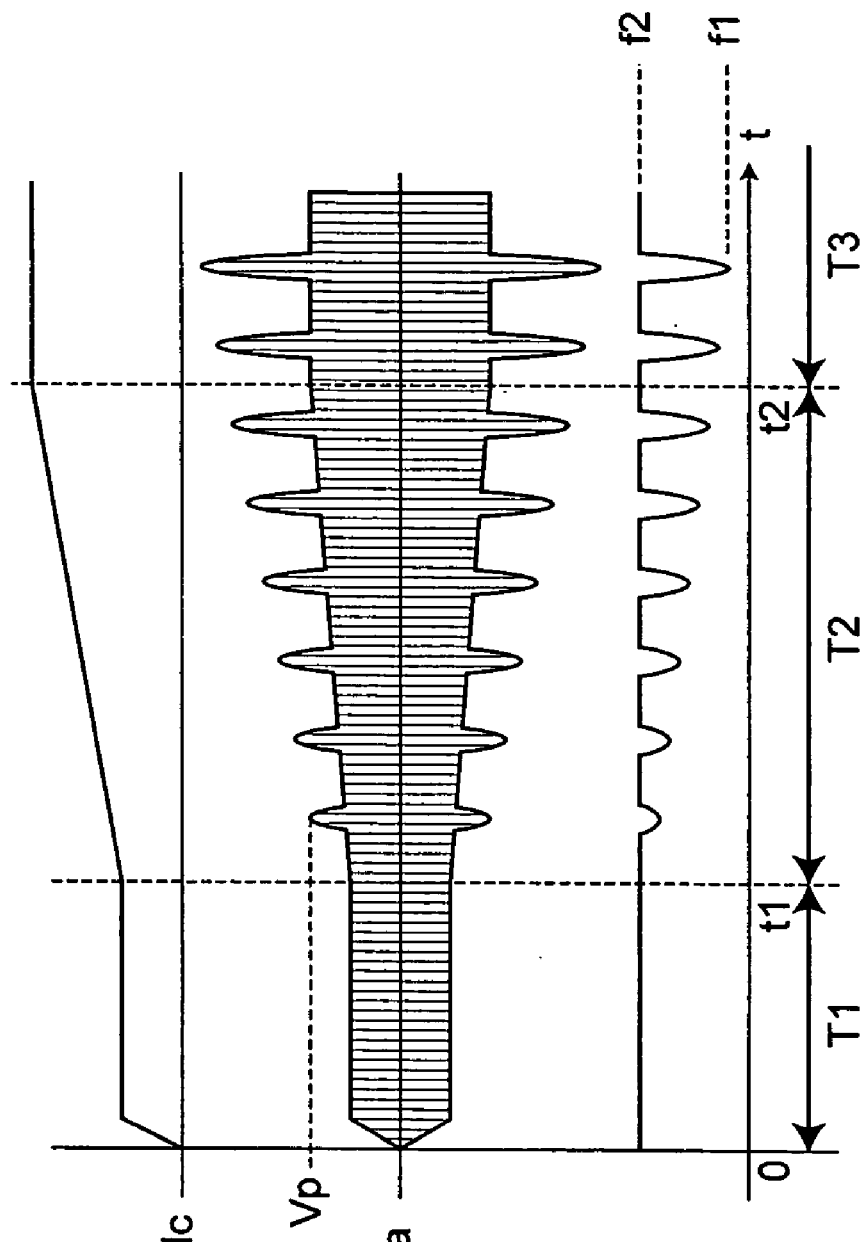

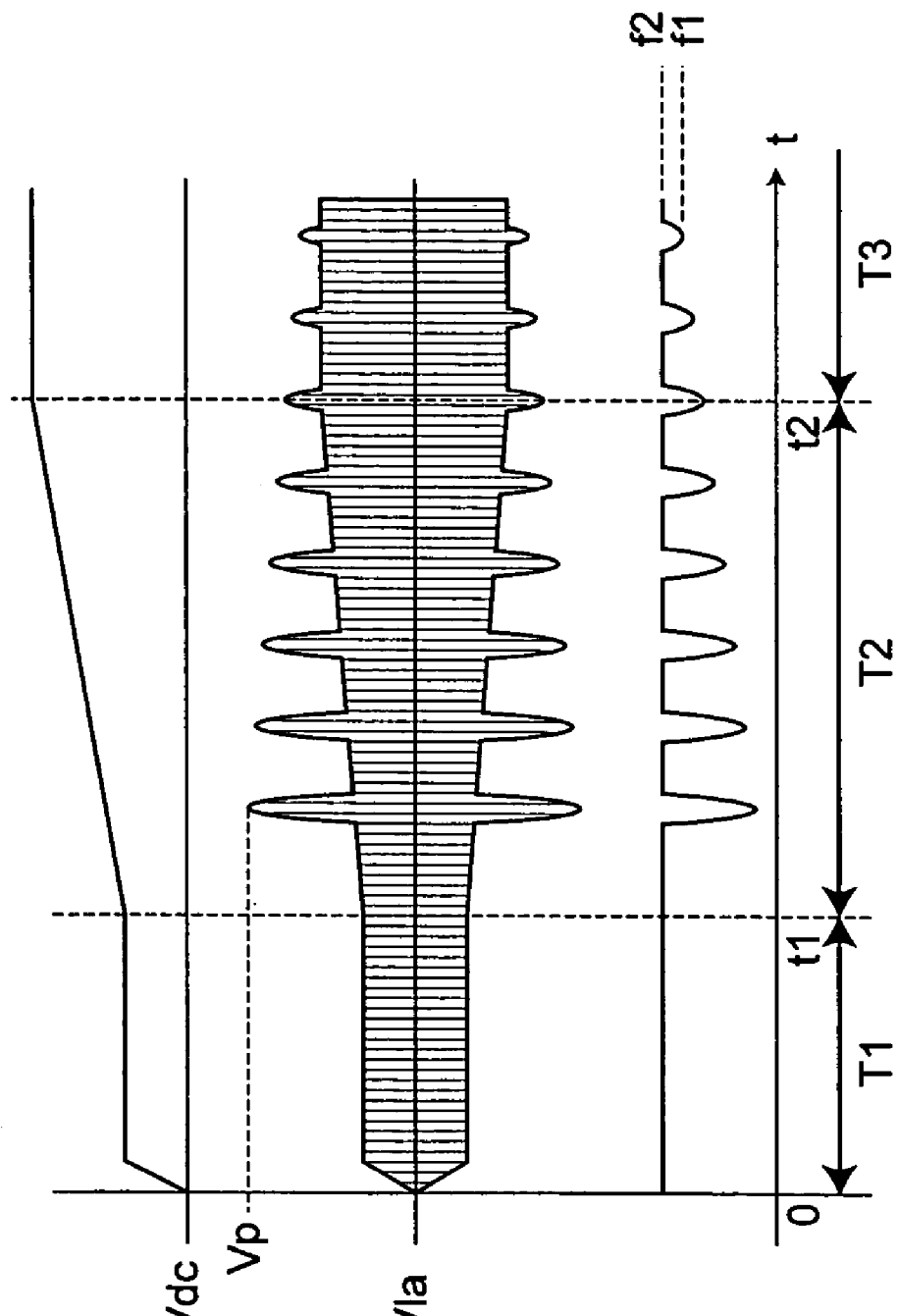

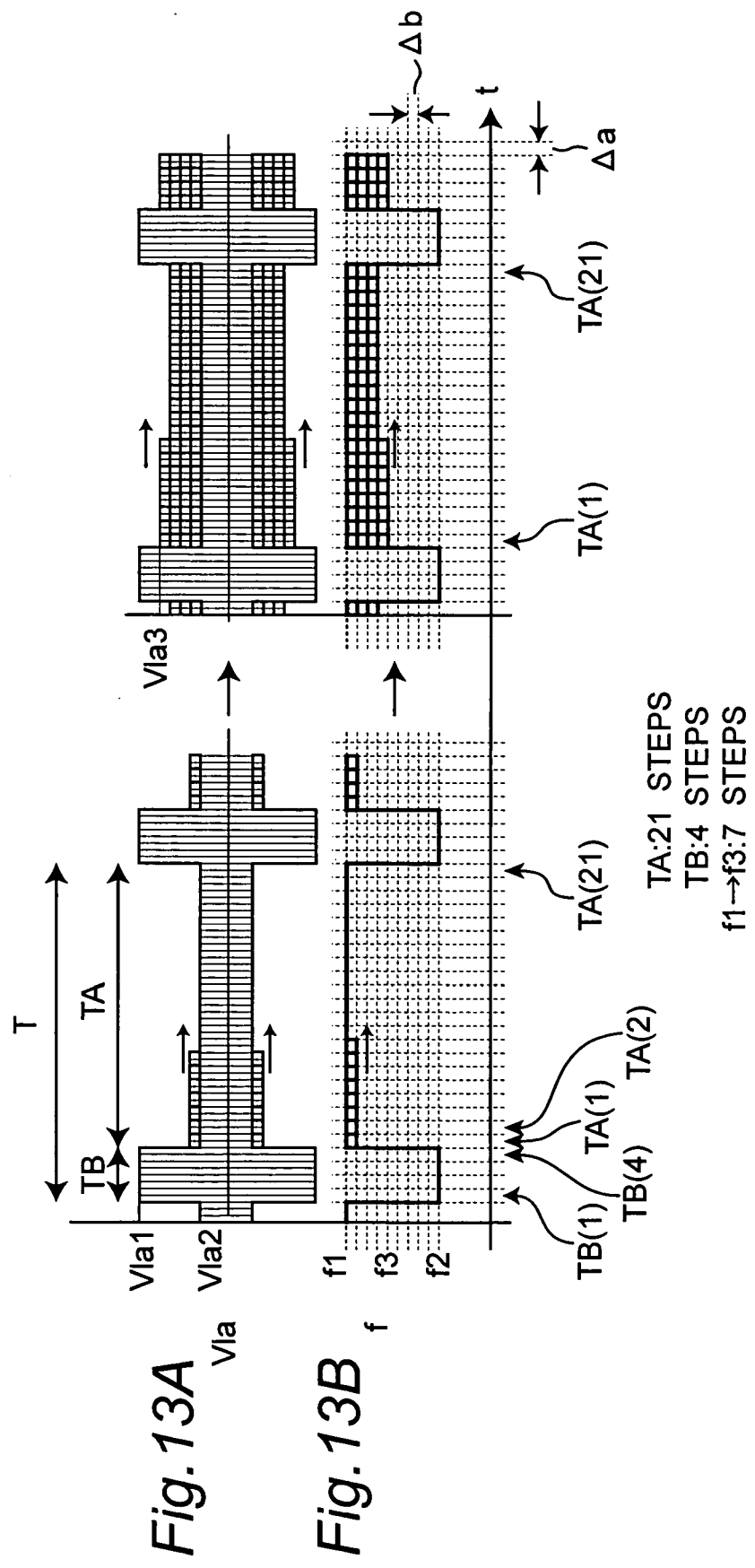

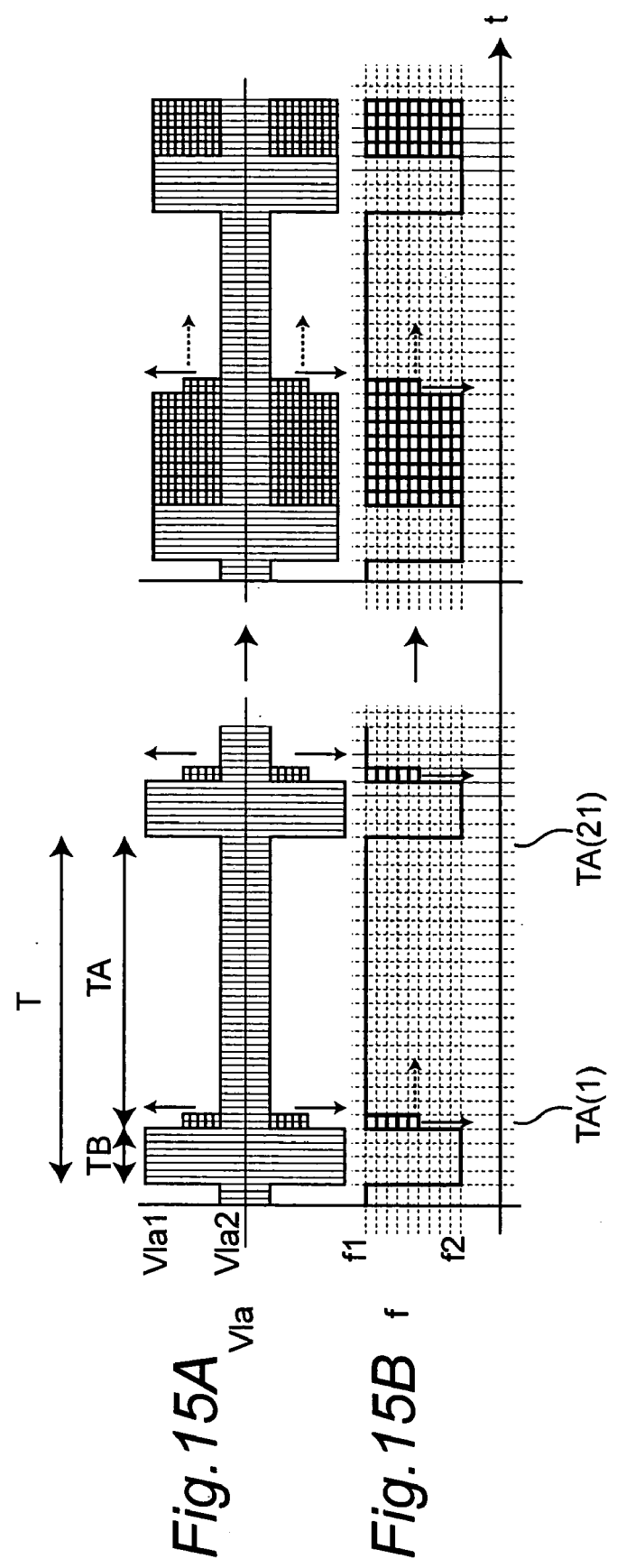

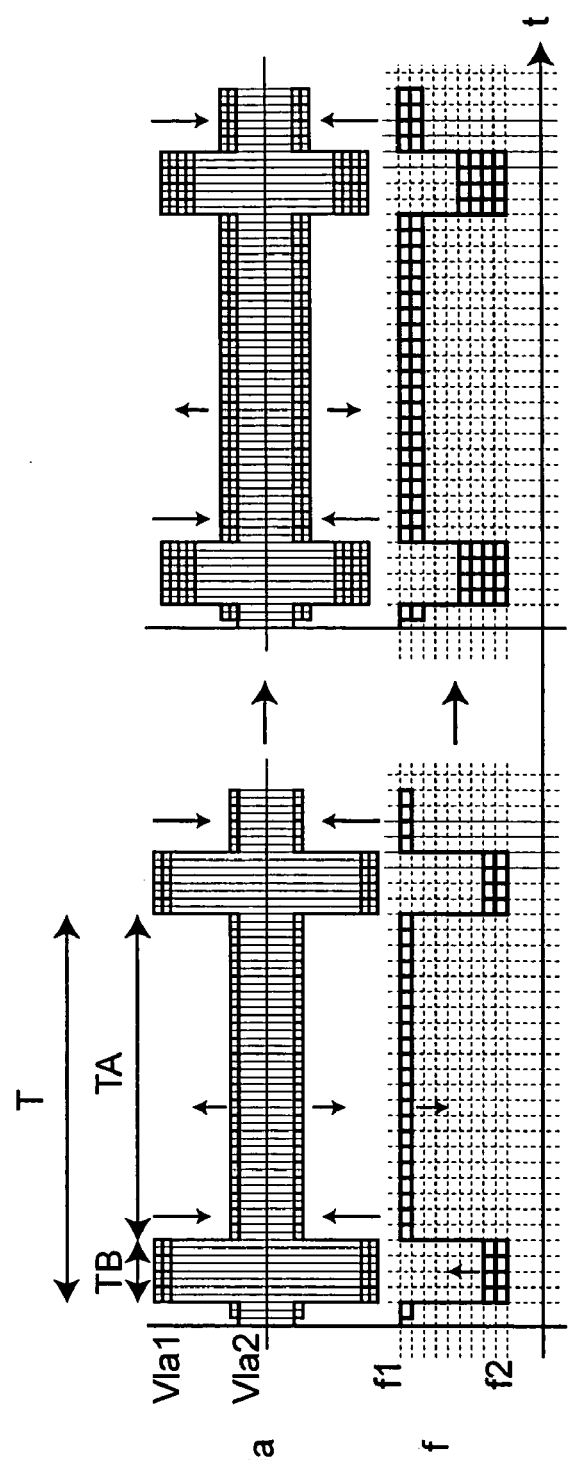

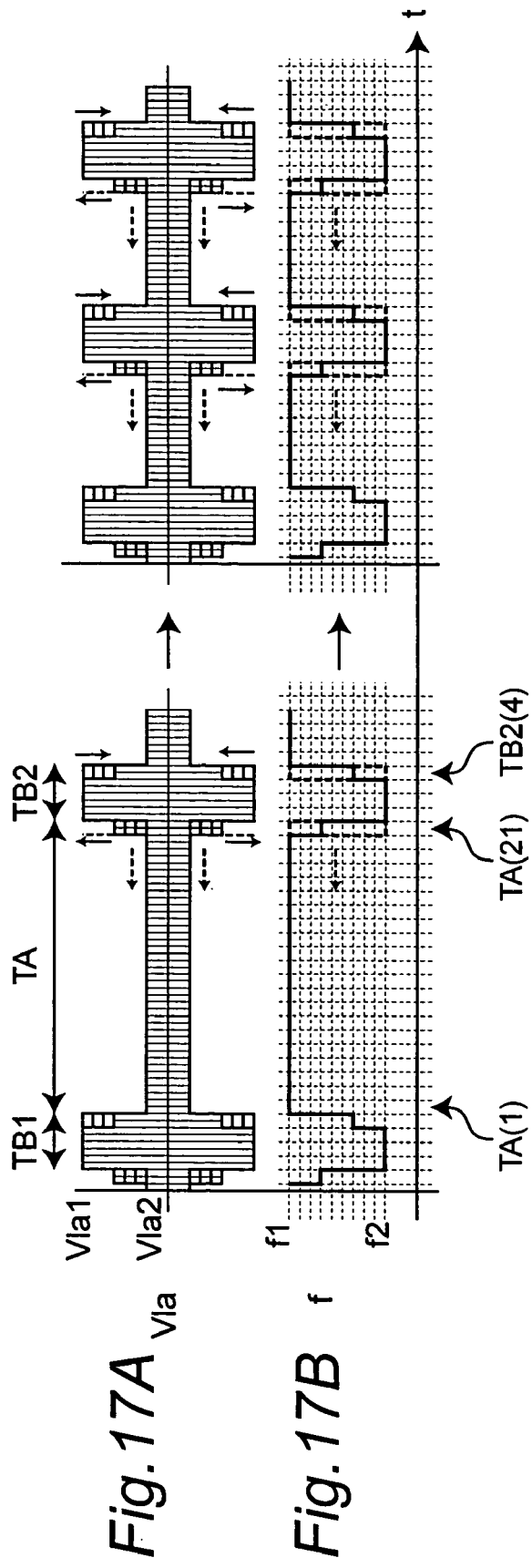

DISCHARGE LAMP OPERATION APPARATUS

TECHNICAL FIELD

The present invention relates to a discharge lamp operation apparatus, and more specifically to a discharge lamp operation apparatus capable of dimming or controlling a light.

BACKGROUND ART

In recent years, a discharge lamp operation apparatus for dimming or controlling a light has been popularly used in various scenes for presentation and energy saving. For an example of this kind of discharge lamp operation apparatus for dimming a light, generally known is one equipped with a chopper circuit for rectifying a voltage from a commercial power supply, and converting and outputting a desired DC voltage, an inverter circuit for converting DC voltage of the chopper circuit to an AC rectangular wave form voltage, a load circuit equipped with a discharge lamp and LC resonance circuit connected to the inverter circuit. In this kind of discharge lamp operation apparatus for dimming, it is general practice to control a driving frequency of switching elements which is included in the inverter circuit in order to control a light.

However, recently, for this kind of discharge lamp operation apparatus for dimming, in order to further increase dramatic effects, a function to enable continuous and stable dimming even to a dimming ratio as low as several % or less (a ratio of light intensity when dimmed to the maximum light intensity) is required, together with a function to prevent unpleasant flash from being generated when the discharge lamp in the dimming state at such a low dimming ratio is turned off and then turned on again.

For the discharge lamp operation apparatus with dimming stabilized by carrying out dimming of the discharge lamp by controlling the output DC voltage of the chopper circuit that supplies power to the inverter circuit without positively controlling the driving frequency of the inverter circuit, there is a prior art disclosed, for example, in U.S. Pat. No. 5,493,182.

Similarly, for the discharge lamp operation apparatus which dims the discharge lamp by controlling the output voltage of the chopper circuit, there is one disclosed, for example, in Japanese Patent Laid-Open Publication No. 58-204496. Because this discharge lamp operation apparatus has a self-oscillating type inverter circuit, dimming of the discharge lamp changes the inverter operating frequency, making it difficult to operate the inverter circuit constantly at the optimum operating frequency. In addition, for other discharge lamp operation apparatus, there is a device disclosed, for example, in Japanese Patent Laid-Open Publication No. 03-115938. This is an active oscillating type inverter circuit in which the inverter operating frequency is set to the vicinity of a resonance frequency of an LC resonance circuit. By controlling the output voltage of the chopper circuit in this condition, dimming of the discharge lamp is carried out. Setting the inverter operating frequency to the vicinity of resonance frequency of the LC resonance circuit in this way can maintain the discharge lamp voltage to a high level even during dimming, and can avoid unstable discharge of the discharge lamp. However, in either system, the dimming ratio that can achieve stable dimming is still high and it has been impossible to start a discharge lamp at a low dimming ratio without generating unpleasant flash.

In addition, for the discharge lamp operation apparatus, which has a function to prevent unpleasant flash from being generated when the lamp is turned on again, there is a prior art disclosed, for example, in U.S. Pat. No. 5,502,423. In this prior art, as shown in FIG. 1 of the prior-art document, a means for intermittently applying a pulse voltage enough to start the discharge lamp is added in a discharge lamp operation apparatus which includes a chopper circuit for converting AC power supply to DC power, an inverter circuit for converting DC power to high-frequency power, and a load circuit including the discharge lamp connected to the output end of the inverter circuit and is configured to operate the inverter circuit in advance and then, drive the chopper circuit.

In this discharge lamp operation apparatus for dimming, as shown in FIG. 2 of the prior-art document, operation of the chopper circuit is stopped in the preheating period of the discharge lamp, and the peak AC line voltage is entered in the input of the chopper circuit. When the preheating period is finished and the startup period begins, operation of the chopper circuit begins and during the startup period the output voltage of the chopper circuit is kept constant. During this startup period, a pulse voltage is superimposed to the discharge lamp, and this superimposed manner of the pulse voltage is to gradually increase the peak of the pulse voltage as the startup time elapses. This can be achieved by gradually increasing the variation range of the inverter driving frequency. When this kind of control is carried out, even the moment when the discharge lamp moves from the startup state to dimming deeply a light state, generation of unpleasant flash of the discharge lamp can be prevented. Furthermore, in U.S. Pat. No. 5,502,423, the driving frequency of the inverter circuit is controlled as shown in FIG. 17 of the prior-art document so that the discharge lamp does not generate flash even during the deep dimming of 0.5% or lower dimming ratio. That is, by turning ON the transistor Q5 while the transistor Q3 is turned ON, the transistor Q3 is forcibly turned OFF to change the ON period of the transistor Q3. As the ON period of transistors Q2 and Q3 becomes imbalanced by this, the oscillation frequency varies, and the output of the inverter circuit 12 is varied extensively. Thus, it is enabled to start dimming with no flash generated even at the deep dimming where the dimming ratio is as 0.5% or lower.

In the above conventional example, dimming of the discharge lamp is achieved by varying the output voltage of the chopper circuit, that is, the input voltage of the inverter circuit. This method is able to increase the stability of the discharge lamp at the time of dimming as compared to the method of dimming the discharge lamp by varying the driving frequency of the inverter circuit. However, even if any of the method is used, conventionally, the lower limit of the dimming ratio that can achieve stable dimmed lighting was about 3%.

The reason will be described hereinafter.

First of all, with respect to the method of varying the operating frequency of the inverter, FIG. 22 shows characteristics (a) of the discharge lamp LA, and the output characteristics (b) of the discharge lamp operation apparatus when the operating frequency f of the inverter circuit is designated as a parameter, where the intersection point of characteristics (a) of the discharge lamp LA and output characteristics (b) of discharge lamp operation apparatus is an operation stabilization point of the discharge lamp. In FIG. 22, increasing the operating frequency f, that is, lowering the dimming ratio gives rise to a case in which a plurality of intersections of the output characteristics (a) of the discharge lamp operation apparatus and characteristics (b) of the discharge lamp LA exist (for example, points A, B, and C in FIG. 22). In such event, there are cases in which the operation stabilization point instantaneously moves to anywhere in points A, B and C in accordance with the condition of the discharge lamp LA and a phenomenon of unstable lighting of the discharge lamp LA occurs (hereinafter called this phenomenon "a jump phenomenon"). In particular, when this jump phenomenon occurs at the deep dimming operation with the dimming ratio is nearly 3% or lower, the discharge lamp causes going-out. Consequently, only increasing the operating frequency f cannot accommodate deep dimming where the dimming ratio is nearly 3% or lower.

Next, with respect to the method of varying the output voltage of the chopper circuit, that is, the input voltage of the inverter circuit, FIG. 23 shows characteristics (a) of discharge lamp LA and output characteristics (b) of discharge lamp operation apparatus in which the output voltage Vdc of the chopper circuit is designated as a parameter. In FIG. 23, when the output voltage Vdc of the chopper circuit is lowered, that is, the dimming ratio is lowered, unlike the case in which the operating frequency f is increased, the operation stabilization point is constantly set to one point only no matter what value the DC voltage Vdc would take. Consequently, when the output voltage Vdc of the chopper circuit is designated as a parameter, no jump phenomenon occurs in a discharge lamp. However, even in this method, when the dimming ratio reaches nearly about 3% or lower, the discharge lamp LA causes flickering, going-out, etc., and it sometimes becomes difficult to stably turn on the discharge lamp LA. Consequently, these discharge lamp operation apparatuses could not meet dramatic applications where dimming at nearly 3% or lower dimming ratio is required.

In addition, where a pulse startup voltage is applied to a discharge lamp in order to prevent unpleasant flash from being generated when the lamp is turned on again, a complicated control circuit is required to gradually increase the variation range of the driving frequency in order to gradually raise the peak pulse voltage, constituting a factor of increasing the cost of the discharge lamp operation apparatus. In addition, when the control of above-mentioned conventional examples is carried out after the discharge lamp moves to the deep dimming lighting condition, the difference between the oscillation frequency in the deep dimming lighting condition and the oscillation frequency when the pulse voltage is generated is excessively large. Thus it becomes sometimes difficult to generate a pulse voltage with a peak value enough to prevent generation of flash in discharge lamp particularly in the deep dimming lighting condition where the dimming ratio is 0.5% or lower.

DISCLOSURE OF INVENTION

The present invention is provided in the light of the above problems, and it is an object of the present invention to provide a discharge lamp operation apparatus that can stably turn on a discharge lamp without generating unpleasant flash in the discharge lamp at the moment the discharge lamp moves to the deep dimming lighting state where the dimming ratio of nearly 0.5% or lower or in the dimming lighting state by a simple control circuit configuration and without generating unpleasant illuminance flickering even when the dimming level of the discharge lamp is varied after lighting.

A discharge lamp operation apparatus according to the invention, includes an AC power supply, a rectifying circuit that rectifies a voltage from the AC power supply, a voltage converting circuit that has at least one switching element and converts the output voltage from the rectifying circuit to a specified voltage, an inverter circuit that has at least one switching element and converts the output voltage of the voltage converting circuit to a high-frequency voltage, a load circuit that includes a discharge lamp and LC resonant circuit and is connected to the inverter circuit, a controller that drives the switching element included in the voltage converting circuit, and a driver that drives the switching element included in the inverter circuit at a specified driving frequency. The controller varies the output voltage of the voltage converting circuit to carry out dimming control of the discharge lamp. The operation apparatus further includes a pulse voltage superimposing section that superimposes a pulse voltage to the voltage applied across the discharge lamp under the condition where the dimming control is carried out in the vicinity of a lower limit of a dimming ratio.

BRIEF DESCRIPTION OF DRAWINGS

FIG. 6A shows changes with time of output voltage Vdc of the voltage converting circuit in application 2 of the first embodiment;

FIG. 6B shows changes with time of voltage V1a applied across both ends of the discharge lamp in application 2 of the first embodiment;

FIG. 6C shows changes with time of the driving frequency (inverter frequency) of a switching element of the inverter circuit by the driver in application 2 of the first embodiment;

FIG. 7A shows changes with time of output voltage Vdc of the voltage converting circuit in application 3 of the first embodiment;

FIG. 7B shows changes with time of voltage V1a applied across both ends of the discharge lamp in application 3 of the first embodiment;

FIG. 7C shows changes with time of the driving frequency (inverter frequency) of a switching element of the inverter circuit by the driver in application 3 of the first embodiment;

FIG. 8A shows changes with time of output voltage Vdc of the voltage converting circuit in another mode of application 3 of the first embodiment;

FIG. 8B shows changes with time of voltage V1a applied across both ends of the discharge lamp in another mode of application 3 of the first embodiment;

FIG. 8C shows changes with time of the driving frequency (inverter frequency) of a switching element of the inverter circuit by the driver in another mode of application 3 of the first embodiment;

FIG. 13A is a diagram showing changes of voltage applied across both ends of a discharge lamp by driving frequency control in the second embodiment;

FIG. 13B is a diagram showing changes of driving frequency by driving frequency control in the second embodiment;

FIG. 15A is a diagram showing changes of voltage applied across both ends of a discharge lamp by driving frequency control in application 1 of the second embodiment;

FIG. 15B is a diagram showing changes of driving frequency by driving frequency control in application 1 of the second embodiment;

FIG. 16A is a diagram showing changes of voltage applied across both ends of a discharge lamp by driving frequency control in another mode of application 1 of the second embodiment;

FIG. 16B is a diagram showing changes of driving frequency by driving frequency control in another mode of application 1 of the second embodiment;

FIG. 17A is a diagram showing changes of voltage applied across both ends of a discharge lamp by driving frequency control in application 2 of the second embodiment;

FIG. 17B is a diagram showing changes of driving frequency by driving frequency control in application 2 of the second embodiment;

BEST MODE FOR CARRYING OUT THE INVENTION

Figure 1:
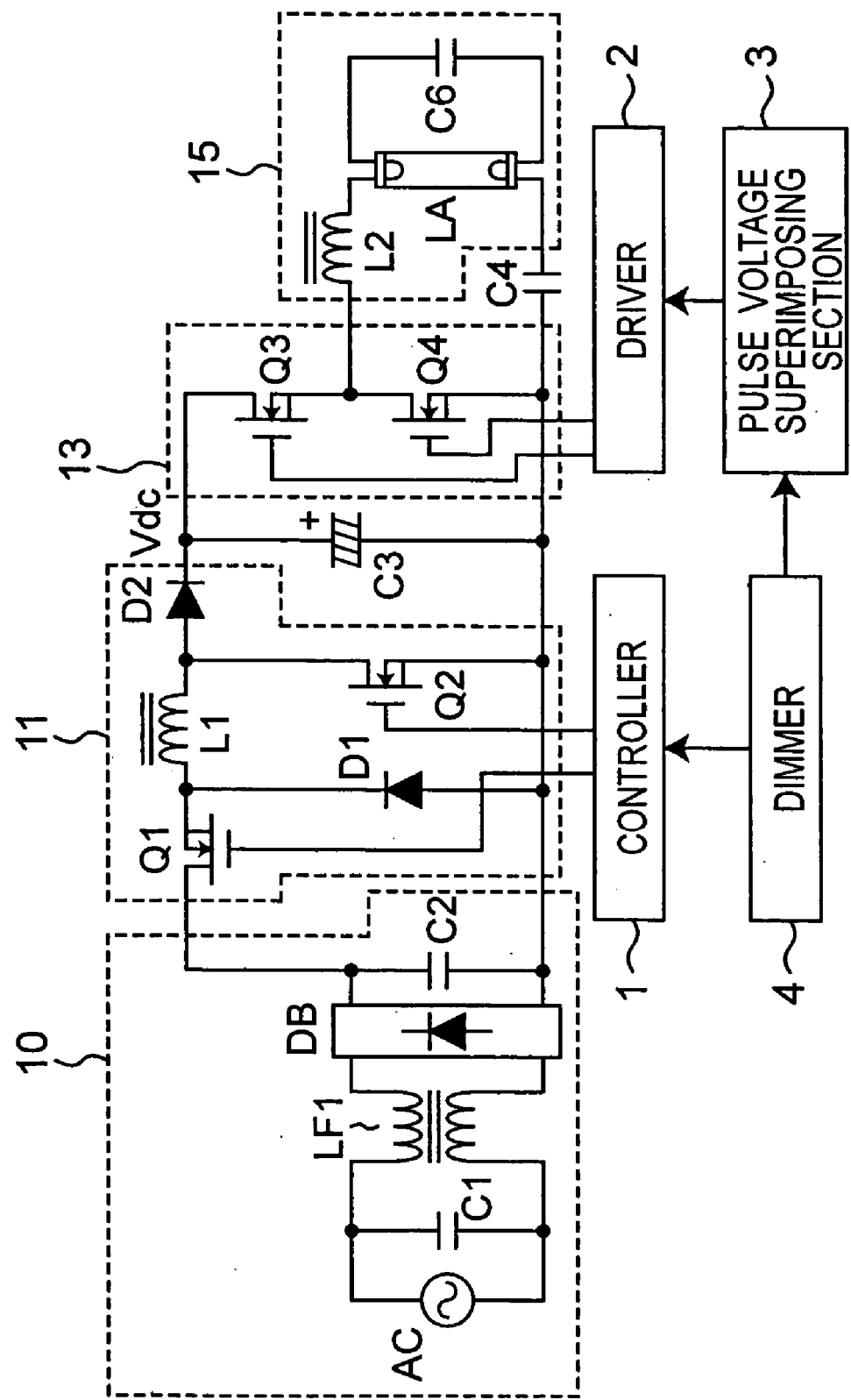
FIG. 1 shows a configuration of a discharge lamp operation apparatus of the first embodiment according to the present invention.
Figure 2:
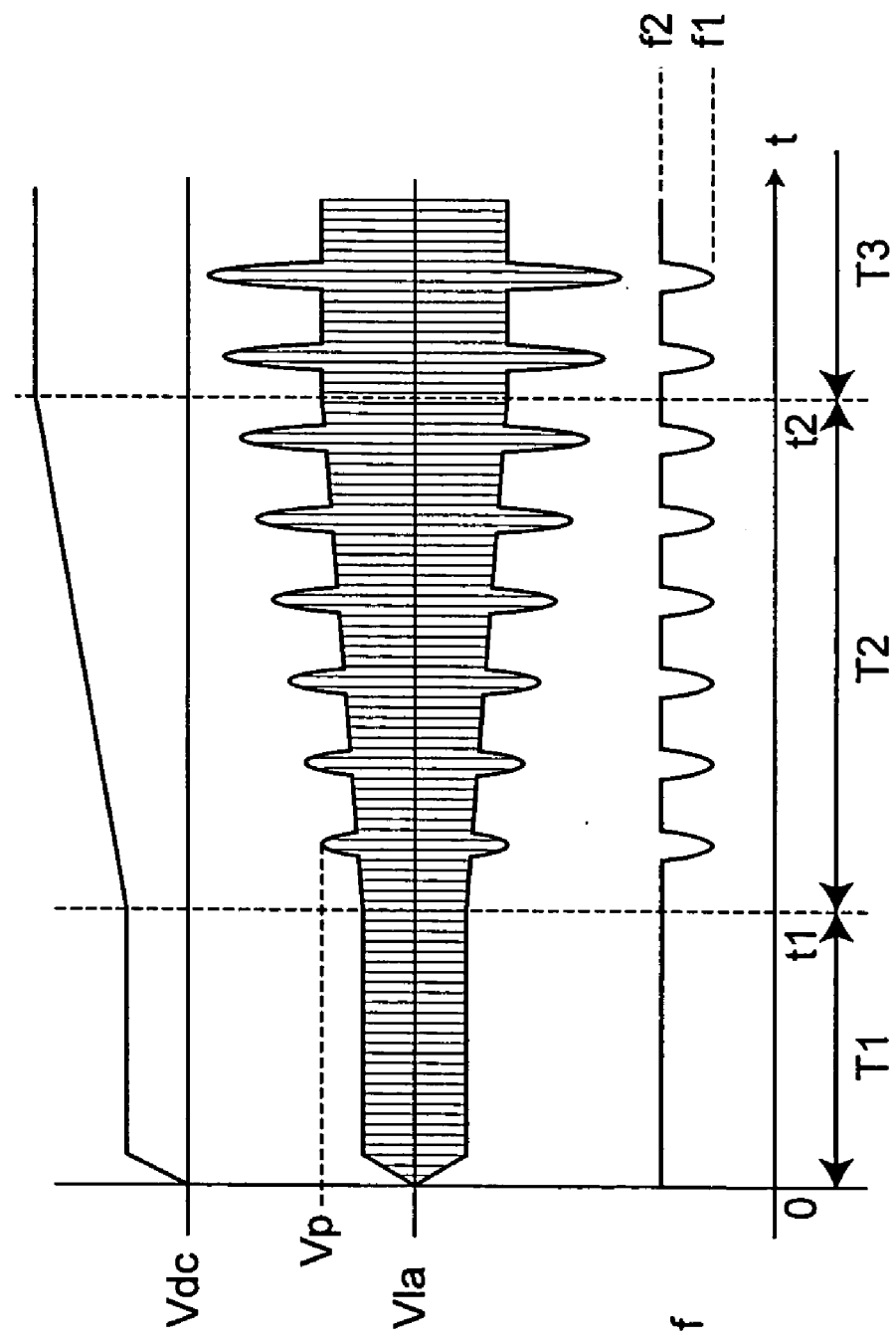
FIG. 2A shows changes with time of output voltage Vdc of the voltage converting circuit.
FIG. 2B shows changes with time of voltage V1a applied across both ends of the discharge lamp.
FIG. 2C shows changes with time of the driving frequency (inverter frequency) of a switching element of the inverter circuit by the driver.

Referring now to the drawings attached, a discharge lamp operation apparatus related to the present invention will be described in detail as follows.

First Embodiment

Referring now to FIG. 1 through FIG. 9, the first embodiment of discharge lamp operation apparatus according to the present invention will be described.

The discharge lamp operation apparatus shown in FIG. 1 includes a DC power supply circuit 10, a voltage converting circuit 11, a smoothing circuit containing capacitor C3, an inverter circuit 13 including switching elements Q3 and Q4, load circuit 15, a DC cut-off capacitor C4, a controller 1 that controls output voltage Vdc of the voltage converting circuit 11, a driver 2 that drives switching elements Q3 and Q4 included in the inverter circuit 13, a pulse voltage superimposing section 3 that controls driver 2 to superimpose a pulse voltage to the voltage applied to the discharge lamp LA, and a dimmer 4 that sends dimming signals to controller 1.

The DC power supply circuit 10 contains an input filter circuit including ac power supply AC, capacitor C1, filter LF1 and capacitor C2, as well as a rectifier circuit DB. The voltage converting circuit 11 includes switching elements Q1, Q2, diodes D1, D2, and inductor L1. The load circuit 15 includes a resonance inductor L2, a resonance capacitor C6 and the discharge lamp LA.

The configuration of each section will be described in detail hereinafter.

The AC power supply AC is an alternating current power supply for commercial use, and voltage is, for example, 100V, 200V, or 242V.

The input filter circuit prevents entry of noise from the AC power supply AC into the inverter circuit 13 or conversely, for preventing noise from the inverter circuit 13 from leaking to the power supply side.

The rectifier circuit DB rectifies AC voltage from the AC power supply AC to pulsating-flow voltage, and includes, for example, a diode bridge.

The voltage converting circuit 11 converts a voltage from the rectifying circuit DB to another voltage, and in the present embodiment, a chopper circuit for stepping up and down a voltage is adopted. Since the operation of this circuit is generally known, description on the operation will be omitted. Now, the voltage converting circuit 11 may be a boost type chopper, a buck type chopper, or a polarity inverting chopper circuit in addition to the voltage buck-boost type chopper. In short, any circuit configuration is acceptable as long as it converts a DC voltage to another DC voltage.

The capacitor C3 which is a smoothing circuit smooths an output voltage of the voltage converting circuit 11, and includes, for example, electrolytic capacitors.

The inverter circuit 13 converts a DC voltage from the capacitor C3 to a rectangular waveform voltage by ON/OFF operation of switching elements Q3 and Q4, and includes, for example, field effect transistors. In the present embodiment, for the inverter circuit 13, two-transistor type half-bridge inverter circuit 13 which has two switching elements Q3 and Q4 is adopted. but it is needless to say that a circuit configuration of the inverter circuit 13 is not limited to this, and it may be a full-bridge type, one-transistor type, or push-pull type inverter circuit. It is noted that the operation of this half-bridge inverter circuit is generally known and the description on the operation will be omitted.

The load circuit 15 starts/lights on the discharge lamp LA by resonance operation of a serial resonance circuit of the inductor L2 and the capacitor C6. The discharge lamp LA is, for example, a fluorescent lamp which has filaments on both ends. Here, when a discharge lamp voltage of the discharge lamp LA is high when it is generally lighted, an insulation transformer or leakage transformer with the discharge lamp LA set as the secondary side may be separately provided.

The DC cut-off capacitor C4 cuts off the dc component that flows in the inverter circuit 13, and thereby the inverter circuit 13 can operate on ac voltage only. The capacity of capacitor C4 is set generally greater than that of capacitor C6.

Controller 1 controls a switching duty or both switching duty and frequency of switching elements Q1 and Q2 to change the output voltage Vdc of the voltage converting circuit 11. Hence, dimming of the discharge lamp LA is enabled. For a specific circuit configuration, for example, an integrated circuit MC34261 available from Motorola may be used.

The driver 2 controls the driving frequency or duty of switching elements Q3 and Q4 that composes the inverter circuit 13. For a specific circuit configuration, for example, a high voltage resistant integrated circuit IR2110 available from International Rectifier Corporation may be used.

The pulse voltage superimposing section 3 transmits control signals for controlling the driving frequency or duty of switching elements Q3 and Q4 to the driver 2.

The dimmer 4 generates dimming signals and transmits the dimming signals to the controller 1. Dimmer NQ21560-321 available from, for example, Matsushita Electric Works may be used.

Next, referring to FIG. 2A through FIG. 2C and FIG. 3, description will be made on modes of operation of discharge lamp of the present embodiment in the preheating and starting processes.

Abscissa of FIG. 2A through FIG. 2C indicates elapsed time after turning on the AC power supply AC at t=0, period T1 is a preheating period for preheating filaments included in the discharge lamp LA, period T2 is a startup period for applying a startup voltage across both ends of the discharge lamp LA, and period T3 indicates a lighting period during which the discharge lamp LA is lighted, respectively. Here, in the lighting period T3, the discharge lamp LA is controlled to have a light output that corresponds to the dimming signal entered from the dimmer 4.

Ordinate of FIG. 2A indicates the output voltage Vdc of the voltage converting circuit, ordinate of FIG. 2B indicates a voltage Vla applied across both ends of the discharge lamp LA (hereinafter called "discharge lamp voltage Vla"), ordinate of FIG. 2C indicates the driving frequency of switching elements Q3 and Q4 by the driver 2, respectively.

Figure 3:
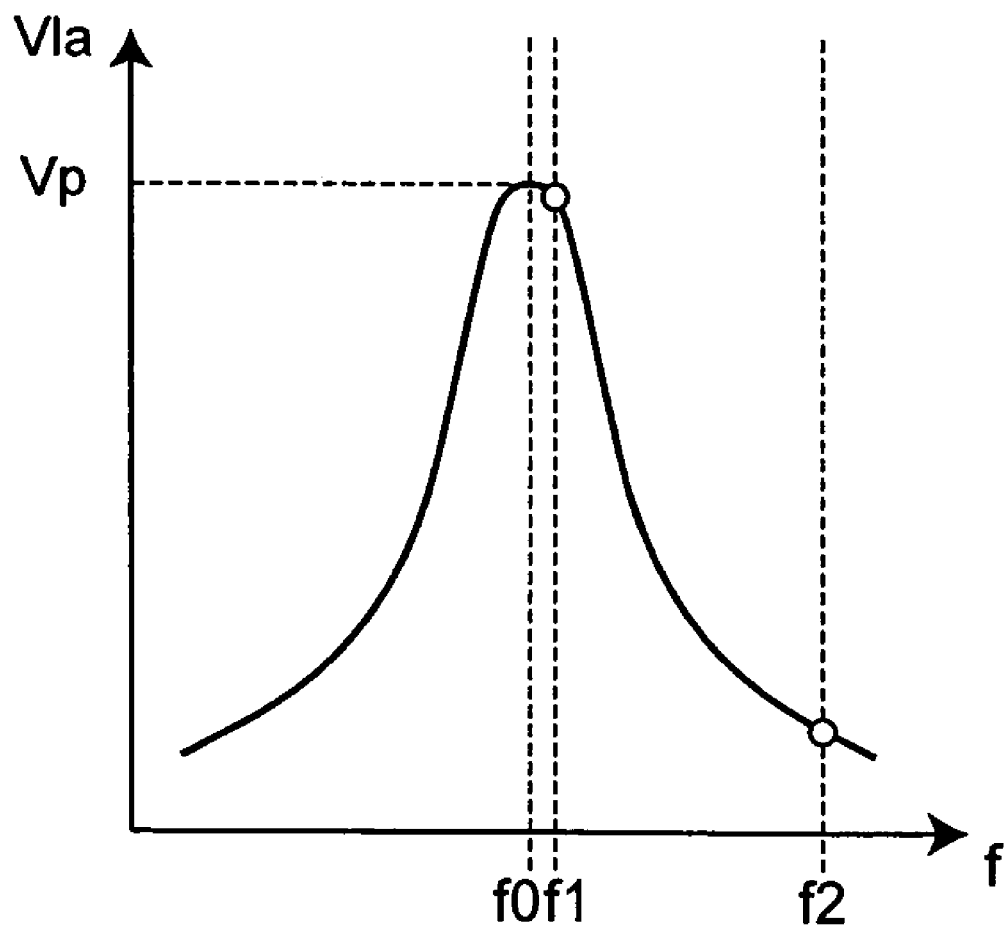
FIG. 3 shows the relationship between the driving frequency of switching element of the inverter circuit and voltage applied to the discharge lamp.

In addition, abscissa of FIG. 3 indicates the driving frequency of switching elements Q3 and Q4 and ordinate thereof indicates the discharge lamp voltage Vla.

Now, turning on AC power supply AC at t=0 causes the voltage converting circuit 11 to begin it's operation, and the voltage converting circuit 11 outputs output voltage Vdc to the inverter circuit 13. At the same time, preheating of the filament of the discharge lamp LA begins. In such event, since the driving frequency f is controlled to be constant by the driver 2, the output voltage Vdc and the discharge lamp voltage Vla are kept constant during this preheating period T1. This discharge lamp voltage Vla is the voltage of a size not to allow the discharge lamp LA to start discharging.

Next, at t=t1, the startup period T2 for applying the startup voltage to both ends of the discharge lamp LA begins. And in this event, the output voltage Vdc is gradually increased by the controller 1. At the same time, the pulse voltage superimposing section 3 begins detection of the start of startup period T2 and transmits frequency modulating signals to driver 2, thereby changing the driving frequency f from f1 to f2 or from f2 to f1. When the driving frequency f is f1, since the inverter circuit 13 operates at the portion with strong resonance as shown in FIG. 3, the inverter circuit 13 can superimpose the pulse voltage Vp with a high peak value on the discharge lamp voltage Vla and thus can apply it to the discharge lamp LA. Now, the changing time of the driving frequency f may be set suitably between a few millisecond to scores of milliseconds in accordance with the kind of discharge lamp and discharge mode. In addition, the peak value Vp of the pulse voltage may be suitably set between hundreds of voltages to several kilovoltages in accordance with the kind of discharge lamp and discharge mode.

It is noted that in the present embodiment, frequency f1 of modulation lower limit of the driving frequency is set to the vicinity of the resonance frequency f0 of the LC resonance circuit, but needless to say, if flash of the discharge lamp LA can be prevented even if the peak value of the pulse voltage is small, the modulation lower limit of the driving frequency should be suitably set to a frequency larger than the resonance frequency f0.

As described above, gradually increasing the output voltage Vdc of the voltage converting circuit 11 by the controller 1 in the startup period T2 as well as superimposing pulse voltage on the discharge lamp voltage Vla applied to the discharge lamp LA by the pulse voltage superimposing section 3 can prevent unpleasant flash generated in the discharge lamp LA even in the vicinity of t=t2 where the startup period T2 of the discharge lamp LA ends and the lighting period T3 which is dimmed lighting begins. When this control is carried out, even if the dimming ratio is nearly 1% or less, in particular, about 0.1%, the flash at the start of the discharge lamp can be suppressed.

According to the present embodiment, it is possible to gradually increase the peak value of the pulse voltage as the startup time passes by the control of DC voltage only without carrying out the complicated control such as varying the driving frequency variation range and thus satisfactory startup characteristics can be obtained without generating flash in the discharge lamp LA.

In addition, according to the experiment of the present applicant, when the startup period T2 is set to 100 milliseconds or more, it has been confirmed that visually smooth start can be achieved. Here, in order to carry out visually smooth start, the ratio of time change of output voltage Vdc may be suitably set.

Next discussion will be made on the dimming action after the discharge lamp operation apparatus starts.

In the discharge lamp operation apparatus according to the present embodiment, for dimming of the discharge lamp LA, the controller 1 controls switching duty or both switching duty and frequency of switching elements Q1 and Q2 to vary DC voltage Vdc to a specified value based on the dimming signal from the dimmer 4, that is, the controller varies the input voltage to the inverter circuit 13. Then DC voltage Vdc is gradually increased in accordance with the level of the dimming signal, and for example, when the dimming ratio becomes 10% or more, the pulse voltage of the discharge lamp LA is gradually lowered and then application of the pulse voltage is stopped. The peak value of the pulse voltage is controlled to gradually lower as the dimming ratio increases.

Figure 4:
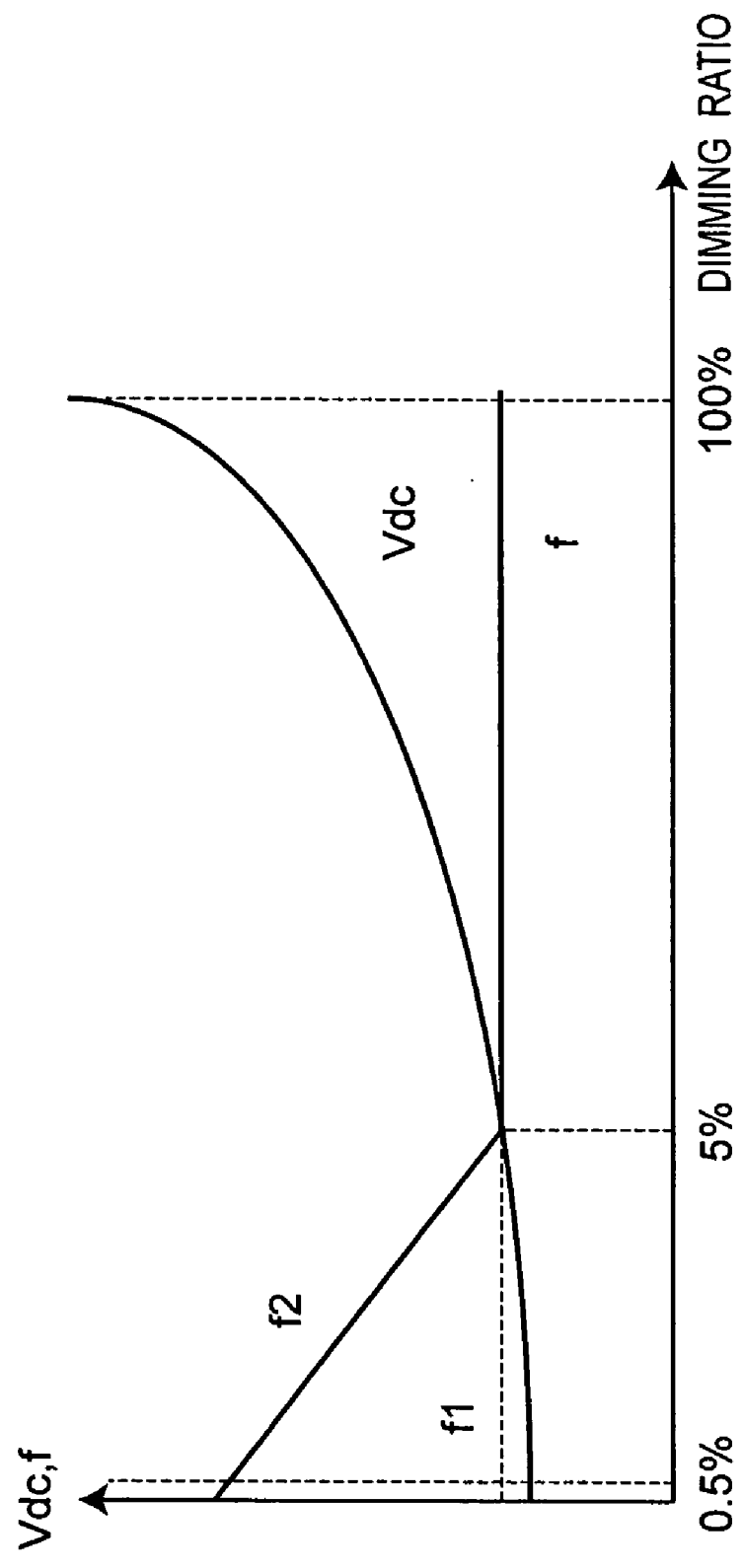
FIG. 4 is a diagram for explaining the dimming mode.

Following control is carried out in order to stably turn on the discharge lamp LA without causing it to go out in the vicinity of the lower limit of the dimming ratio (about 3%). Referring to FIG. 4, at the dimming ratio about 5% or more, dimming of the discharge lamp LA is carried out by gradually lowering DC voltage Vdc as the dimming ratio lowers. When the dimming ratio becomes about 5% or less, the pulse voltage is gradually generated with dc voltage Vdc gradually lowered while the driving frequency is being modulated between f1 and f2.

The discharge lamp operation apparatus shown in the present embodiment can achieve startup of a discharge lamp from deep dimming and dimming control after the startup by a series of controls of the DC voltage, and enables stable dimming which covers a wide range such as the dimming ratio from 0.5% to 100% as well as smooth startup free of the flash by comparatively simple control.

(Application 1)

Figures 5A, 5B, 5C:
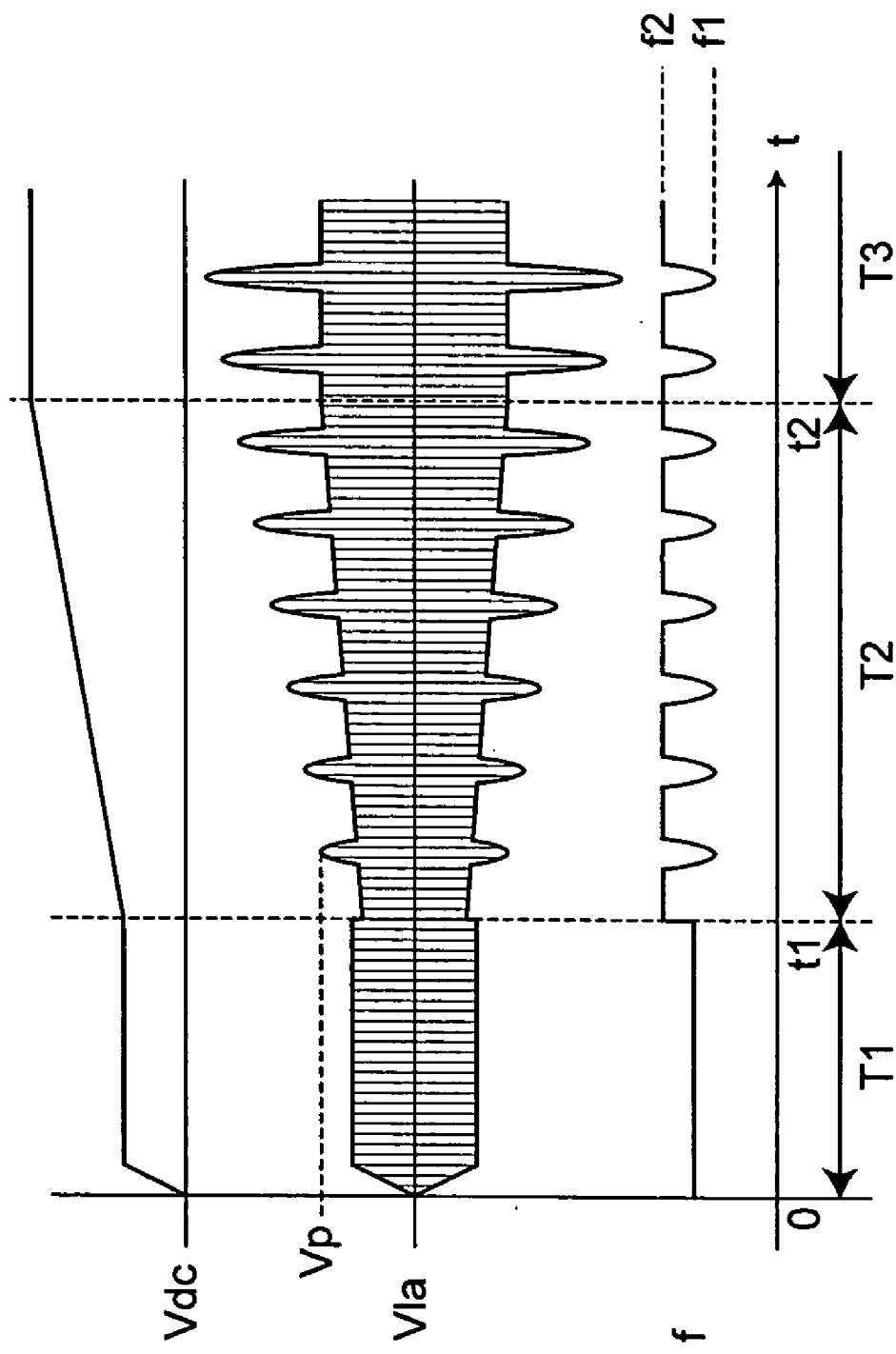
FIG. 5A shows changes with time of output voltage Vdc of the voltage converting circuit in application 1 of the first embodiment.
FIG. 5B shows changes with time of voltage V1a applied across both ends of the discharge lamp in application 1 of the first embodiment.
FIG. 5C shows changes with time of the driving frequency (inverter frequency) of a switching element of the inverter circuit by the driver in application 1 of the first embodiment.

Referring now to FIGS. 5A through FIG. 5C, an application according to the present embodiment will be described. The circuit configuration of the present application is same as that shown in FIG. 1 (This is true for applications hereinafter).

In the present application, the driving frequency at the end of the preheating period T1 is brought lower than the driving frequency at the start of the period T2 (see FIG. 5C). That is, the discharge lamp voltage at the end of the preheating period T1 is brought greater than the discharge lamp voltage at the start of the startup period T2 (see FIG. 5B). Depending on a type of the discharge lamp or the circuit configuration, the controller 1, the driver 2, and the pulse voltage superimposing section 3, and the discharge lamp LA may go on and the flash may be generated at a moment preheating period T1 ends and startup period T2 begins (t=t1), that is, at the time of mode change when preheating is changed over to start. Even in such event, by carrying out the above control, it becomes possible to suppress pulse peak voltage at the start of startup mode and generation of flash at the time of mode change can be suppressed.

Operations, effects, etc. which have not been particularly stated in the above description are same as those stated in the embodiment mentioned above.

(Application 2)

Referring now to FIG. 6A through FIG. 6C, another application of the present example will be described.

In the present embodiment, as shown in FIG. 6C, even in the preheating period T1, the pulse voltage is superimposed on the discharge lamp LA while the driving frequency f is being varied from f1 to f2 or from f2 to f1 by the pulse voltage superimposing section 3 and the driver 2. When this control is carried out, a circuit to detect the time of ending the preheating period T1 or the time of initiating the startup period T2 is no longer required, and the circuit configuration of the pulse voltage superimposing section 3 and driver 2 can be simplified.

It is noted that operations, effects, etc. which have not been particularly stated in the above description are same as those stated in the first embodiment.

(Application 3)

Still more specific application will be explained referring to FIG. 7A through FIG. 7C and FIG. 8A through FIG. 8C.

In the present application, as shown in FIG. 7C or FIG. 8C, in startup period T2, variation range of the driving frequency f is gradually increased or decreased by pulse voltage superimposing section 3 and driver 2.

Depending on the kind of the discharge lamp and the discharge mode, there are cases in which the electric discharge may become unstable when a low pulse voltage is superimposed on the discharge lamp LA at the start of the lighting period T3 and flickering or moving striation are generated. Therefore, as shown in FIG. 7C by gradually increasing the variation range of the driving frequency f by the pulse voltage superimposing section 3 and the driver 2, the sufficient pulse voltage is applied after lighting starts and flickering and moving striation can be suppressed.

Alternately, on the contrary, depending on the type of the discharge lamp and the discharge mode, there are cases in which it is possible to suppress generation of flickering or moving striation of the discharge lamp LA rather by superimposing a low pulse voltage right after the start of the lighting period T3. In this type of discharge lamp, the control to gradually decrease the variation range of the driving frequency f may be carried out by the pulse voltage superimposing section 3 and the driver 2 as shown in FIG. 8C.

Even in the present embodiment, a cycle of a pulse voltage superimposing cycle and peak value of pulse voltage may be suitably set in accord with the type of the discharge lamp and the discharge mode.

Operations, effects, etc. which have not been particularly stated in the above description are same as those stated in the first embodiment.

(Application 4)

Even further application will be explained referring to FIG. 9A through FIG. 9C.

Figures 9A, 9B, 9C:
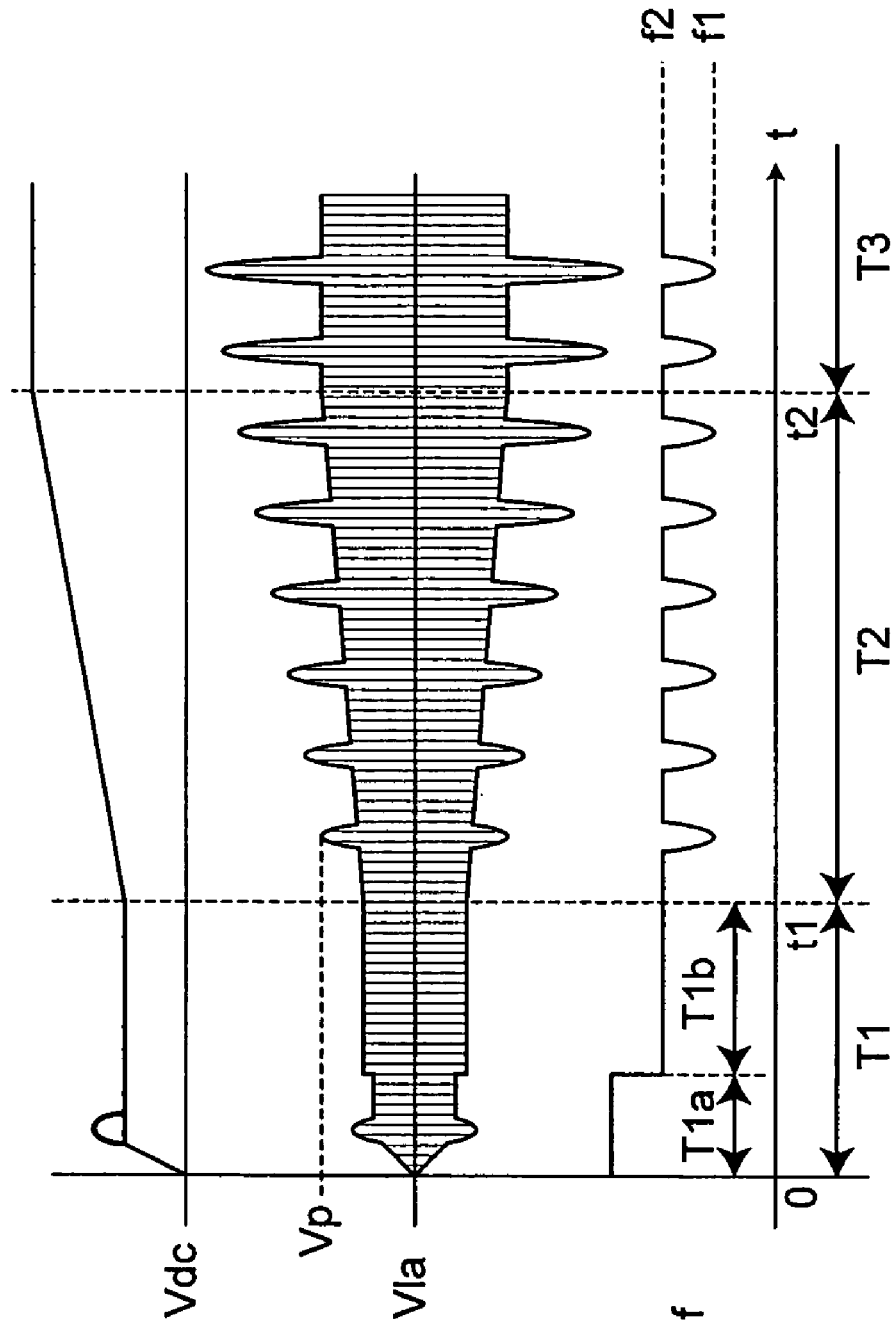
FIG. 9A shows changes with time of output voltage Vdc of the voltage converting circuit in application 4 of the first embodiment.
FIG. 9B shows changes with time of voltage V1a applied across both ends of the discharge lamp in application 4 of the first embodiment.
FIG. 9C shows changes with time of the driving frequency (inverter frequency) of a switching element of the inverter circuit by the driver in application 4 of the first embodiment.

In the present application, as shown in FIG. 9C, in the preheating period T1, the driving frequency of a specified period T1a right after the start of the preheating period T1 is brought higher than the driving frequency of a specified period T1b after the period T1a.

There are cases in which so-called overshoot voltage is superimposed on the output voltage Vdc at a moment ac power supply AC is turned on at t=0 and then the voltage converting circuit 11 begins operation. In order to prevent the flash from being generated in the discharge lamp LA even when this kind of overshoot voltage is superimposed on the output voltage Vdc, the control is made to keep the driving frequency high, that is, to keep the discharge lamp voltage Vla low, in a specified period longer than the period (period T1a) in which the overshoot voltage is generated. Controlling in this way causes the discharge voltage Vla to be low and can prevent generation of the flash even when the overshoot voltage is superimposed on the output voltage Vdc.

It is noted that operations, effects, etc. which have not been particularly stated in the above description are same as those stated in the first embodiment.

Second Embodiment

Referring now to FIG. 10 through FIG. 17B, the second embodiment according to the present invention will be described, wherein like reference numerals designate like or corresponding parts in the configuration same as the first embodiment.

Figure 10:
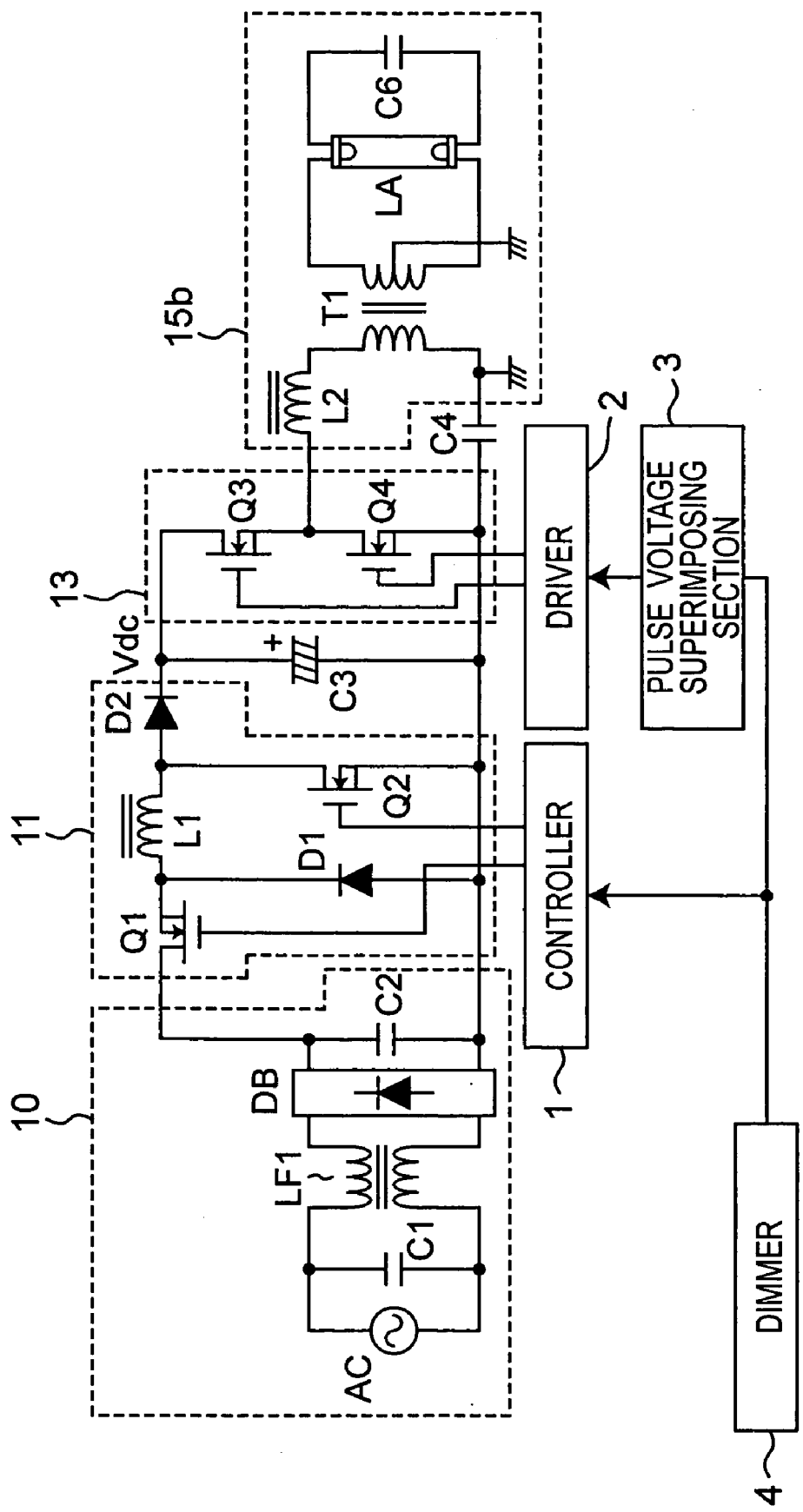
FIG. 10 shows a configuration of a discharge lamp operation apparatus of the second embodiment according to the present invention.

FIG. 10 shows a configuration of the discharge lamp operation apparatus according to the present embodiment. Differences in configuration between the discharge lamp operation apparatus shown in FIG. 10 and the discharge lamp operation apparatus shown in FIG. 1 lie in installing an insulation transformer T1 with the inverter circuit 13 side set as the primary side and the load circuit 15b side set as the secondary side and grounding the middle point of the secondary side of the insulation transformer T1.

Figure 11A:
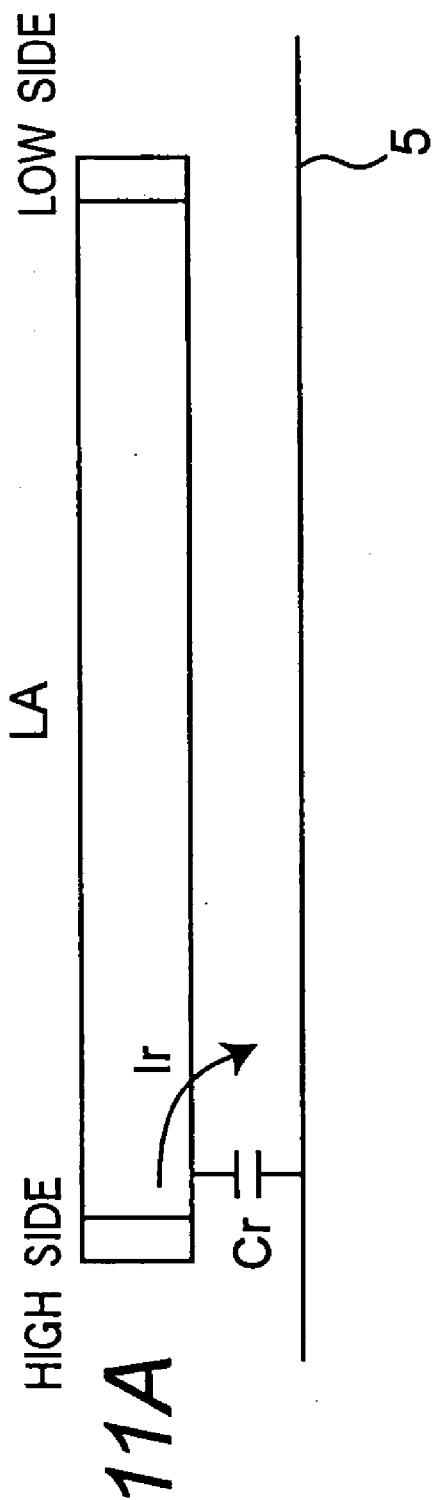
FIG. 11A is a diagram for explaining leak current of a discharge lamp when no insulation transformer is present in a load circuit.
Figure 11B:
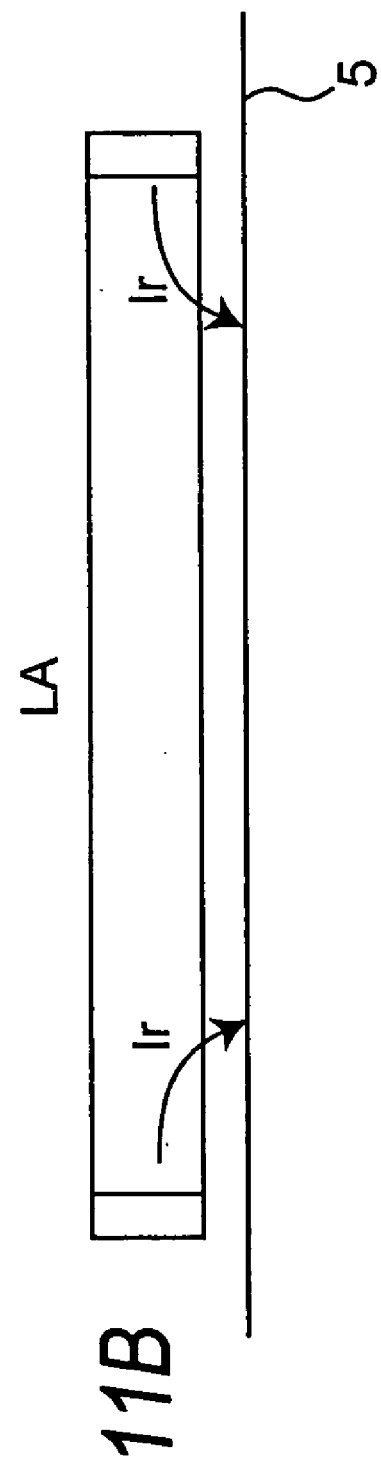
FIG. 11B is a diagram for explaining leak current of a discharge lamp when an insulation transformer is present.

FIG. 11A is a drawing for explaining a leak current of the discharge lamp LA when the insulation transformer is not located in the load circuit, whereas FIG. 11B is a drawing for explaining a leak current of the discharge lamp LA when the insulation transformer is installed. In the discharge lamp operation apparatus as shown in FIG. 1 in which no insulation transformer T1 is located, high-frequency potentials to the ground of both ends of the discharge lamp LA differ, respectively. Consequently, as shown in FIG. 11A, a high-voltage side with a large voltage with respect to the ground and a low-voltage side with a small voltage with respect to the ground are generated in discharge lamp LA. Accordingly, there is a case in which a part of the discharge lamp current (leak current Ir) leaks particularly from high-voltage side of the discharge lamp LA to ground via several hundreds of picofarads floating capacitance Cr formed across the discharge lamp LA and the operation apparatus 5. This leak current Ir is, in general, about several miliamperes to scores of miliamperes, and for this leak current, the illuminance on the high-voltage side becomes smaller than that of the low-voltage side, but when the dimming ratio is scores of %, imbalance of illuminance on both sides of the discharge lamp LA scarcely causes problems. However, when the dimming ratio becomes several %, in particular, nearly 3% or lower, imbalance of illuminance between both ends of the discharge lamp becomes conspicuous.

In particular, when high pulse voltage is superimposed, leak current Ir increases and imbalance of illuminance becomes noticeable.

Therefore, according to the discharge lamp operation apparatus of the present embodiment, insulation transformer T1 is provided on the load circuit 15b and the middle point of the secondary side of the insulation transformer T1 is grounded. Thus, high-frequency potentials to the ground at both ends of the discharge lamp LA become nearly equal. Consequently, as shown in FIG. 11B, leak currents Ir that leak from both ends of the discharge lamp LA to the ground become nearly equal, and even when the dimming ratio reaches nearly 3%, imbalance of illuminance does not occur.

Now, the discharge lamp operation apparatus of the present embodiment will be described more specifically.

Figure 12:
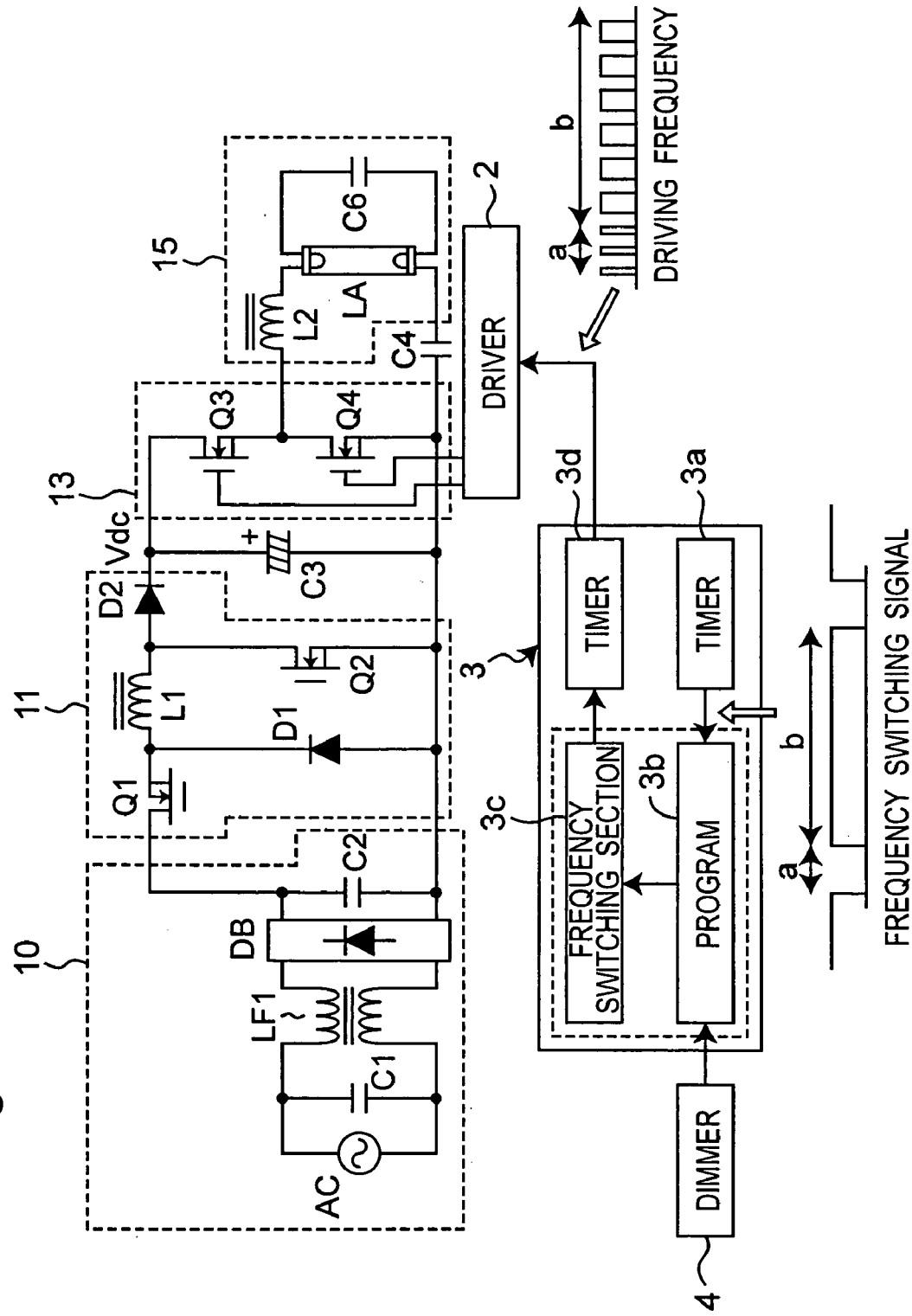
FIG. 12 shows a configuration of a pulse voltage superimposing section of the second embodiment.

FIG. 12 is a drawing more specifically showing the pulse voltage superimposing section 3 of the present embodiment. The pulse voltage superimposing section 3 is composed of a digital controller (3) which varies the driving frequency of switching elements Q3 and Q4 stepwise.

The digital controller 3 generates signals for controlling the driving frequency which is generated by the driver 2. The digital controller 3 has timers 3a, and 3d, program 3b, and a frequency switching section 3c. The digital controller 3 can be comparatively easily configured using, for example, general-purpose microcomputer ST72215, etc. available from STMicroelectronics.

Now, digital controller 3 will be described further in detail.

Timer 3a is intended to transmit a timing signal which switches the driving frequency and generates pulses to the program 3b and has a digital timer counter inside. That is, when a frequency switching signal (a) as shown, for example, in FIG. 12 is generated as a frequency switching signal from the timer 3a, the timer 3d receives the transmitted frequency switching signal (a), and controls the driving frequency generated by the driver 2 to be the frequency (a) via the program 3b and the frequency switching section 3c. In addition, when the timer 3a generates a frequency switching signal (b), the timer 3d receives the transmitted frequency switching signal (b), and controls the driving frequency generated by driver 2 to be the frequency (b) via the program 3b and the frequency switching section 3c. Next discussion will be made on a method for controlling height of the pulse voltage in accordance with the dimming signal entered from the dimmer 4 in the pulse voltage superimposing section 3 using a digital control means such as this microcomputer.

Abscissa t of FIG. 13A and FIG. 13B indicate the elapsed time, whereas ordinate of FIG. 13A indicates the voltage Vla applied across the discharge lamp LA and ordinate of FIG. 13B indicates the driving frequency f. In the figure, $\Delta a$ is the minimum resolution of a clock of the timer $3a$, and $\Delta b$ is the minimum resolution of a clock of the timer $3d$.

Here, the voltage Vla when the driving frequency f is f1 is designated as Vla2. The voltage Vla when the driving frequency f is f2 is designated as Vla1. The voltage Vla when the driving frequency f is f3 is designated as Vla3. In addition, in the present embodiment, the driving frequency f is varied from f1 to f2 discretely in nine steps upon receipt of the frequency switching signals from the timer $3a$. Here, let f(1) (=f1), f(2), ..., f(9) (=f2) (f(1)≧f(2)≧ ... f(9)) denote the discrete frequency f corresponding to each step. In addition, in the present embodiment, T denotes the period in which the pulse voltage is superimposed, TA denotes an interval in which the discharge lamp operation apparatus operates when the driving frequency f is f1, and TB denotes an interval in which the discharge lamp operation apparatus operates when the driving frequency f is f2, and the interval TA is further divided into twenty-one intervals, and TA(1), TA(2), ... TA(21) denote the respective intervals (advance degree of phase satisfies TA(1)<TA(2)< ... <TA(21)).

Now, in FIG. 13, the discharge lamp LA is dimmed with a pulse lower limit voltage set to Vla2, and on this discharge lamp LA, a pulse voltage of Vla1 is superimposed at a cycle T. Considered is the case in which the dimming level is varied from this dimming condition to a dimming condition where the pulse voltage is completely removed.

As described above, when the frequency switching signal (b) is transmitted from the timer $3a$, the driving frequency in the interval TA(1) is varied from f(1) to f(2) based on the command of the program $3b$. That is, as the discharge lamp voltage Vla in the interval TA(1) increases, illuminance of the discharge lamp LA slightly increases. Then, the driving frequency of the interval TA(2) is varied from f(1) to f(2) and illuminance of the discharge lamp La further slightly increases. The driving frequency of each interval up to the interval TA(21) is successively varied from f(1) to f(2). Thereafter, the driving frequency of the interval Ta(1) is varied from f(2) to f(3), and in the similar manner, each driving frequency of each interval up to the interval TA(21) is varied from f(2) to f(3).

As described above, in the present embodiment, in the interval TA, the driving frequency of each interval from the interval TA(1) to the interval TA(21) is increased successively in increments of one step and when one step of frequency increase is finished in the whole interval, the cycle returns to the first interval, that is the interval TA(1), and in the similar manner, the driving frequency of each interval up to the interval TA(21) is further increased in increments of one step. Thereafter, in each interval TA(1) to TA(21) of the interval TA, the above-mentioned operation is repeated until the driving frequency is increased by nine steps.

In this way, in the present embodiment, successively repeating the above operations, the pulse height can be gradually varied in 189 (=21×9) steps.

As compared to the conventional digital control method in which driving frequencies of the intervals TA(1) through TA(21) are all varied simultaneously from f(1) to f(2), in the present embodiment, the driving frequency is varied with sufficient resolution. Therefore, illuminance of the discharge lamp LA can be varied stepwise without causing human eyes to feel flickering or step-by-step changes of illuminance. Consequently, for human eyes, the step-by-step changes of illuminance can be felt as continuous changes of illuminance and do not give unpleasant feeling to users.

Needless to say, the interval TA and the dividing mode of the driving frequency can be suitably set within a range that would cause no unpleasant feeling to users.

Figures 14A, 14B:
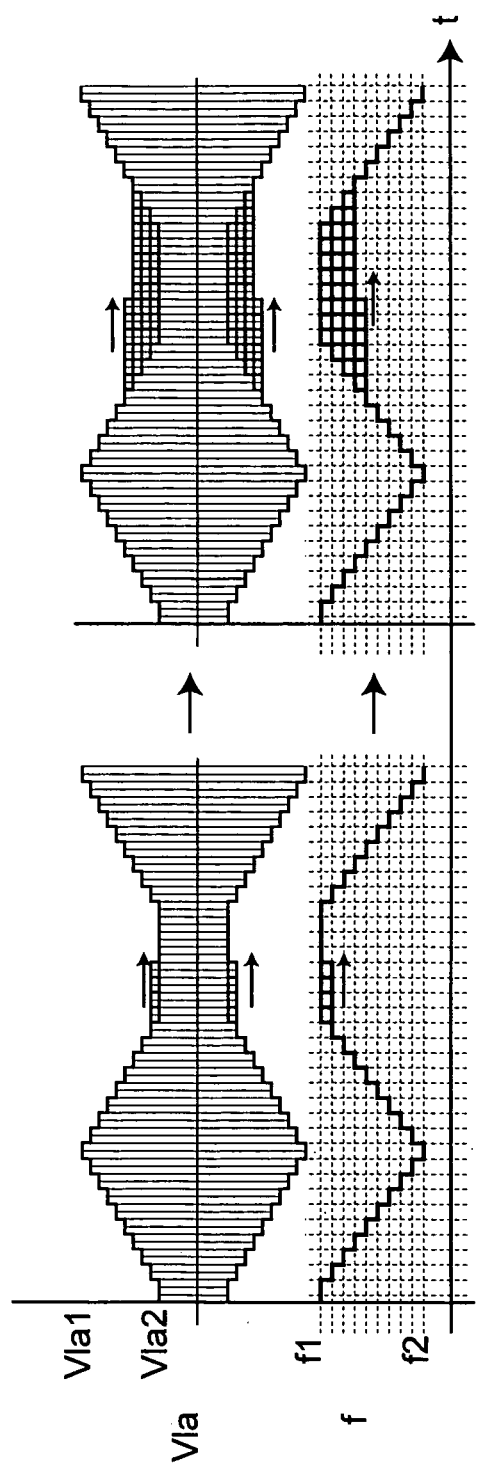
FIG. 14A is a diagram showing changes of voltage applied across both ends of a discharge lamp by driving frequency control in the second embodiment (where pulse voltage with gradient is superimposed to a discharge lamp)
FIG. 14B is a diagram showing changes of driving frequency by driving frequency control in the second embodiment (where pulse voltage with gradient is superimposed to a discharge lamp)

In addition, when consideration is given to stress given to electronic parts of the discharge lamp operation apparatus, there is a case in which the pulse voltage with rising and trailing gradients provided is superimposed on the discharge lamp LA as shown in FIGS. 14A and 14B. Even in such event, carrying out the control similar to the above embodiment can vary the dimming level without causing unpleasant flickering to the discharge lamp LA.

In addition, for example, there is a case in which the pulse voltage with high peak value is no longer required to be superimposed due to a change in ambient temperature of the discharge lamp LA. In such event, the concept of the above embodiment could be applied and the peak value of the pulse voltage can be reduced without providing unpleasant feeling to users. That is, in such event, the interval TB is divided into small intervals of TB(1), TB(2), ... TB(4) (advance degree of phase satisfies TB(1)<TB(2)< ... <TB(4)) and the driving frequency is varied from f(9) to f(8) successively from interval TB(1) as is the case with the above embodiment. By suitably setting the contents of the program $3b$, this control of the driving frequency can be achieved, too, and the peak value of the pulse voltage can be varied without providing unpleasant feeling to users.

(Application 1)

Even when a control shown in FIGS. 15A and 15B is carried out as an application of the present embodiment, the pulse voltage level can be varied without causing unpleasant flickering to the discharge lamp LA.

That is, first of all, the driving frequency of the interval TA(1) is varied from f(1) to f(2). Then, the driving frequency of the interval TA(1) of the same interval is varied from f(2) to f(3). And, then, the driving frequency of the interval TA(1) is successively varied from f(3) to f(4), and when the driving frequency of the interval TA(1) becomes f(9), then, the process moves to the interval TA(2), and the driving frequency of the interval TA(2) is varied successively from f(1) to f(9). Thereafter, similarly, the driving frequency of each interval is successively varied. Even if this kind of control is carried out, the dimming level can be varied without causing unpleasant flickering to the discharge lamp LA as is the case with the above embodiment.

The control mode of the above driving frequency can be easily achieved by suitably setting the program $3b$.

In addition, as shown in FIGS. 16A and 16B, a control for raising the pulse lower limit value in the interval TA may be carried out in conjunction with a control for lowering the peak value of the pulse voltage in the interval TB, and thus, it becomes possible to suppress illuminance variation of the discharge lamp LA caused by variation in a pulse voltage, and the pulse voltage can be controlled without causing unpleasant flickering to the discharge lamp LA.

(Application 2)

Referring now to FIGS. 17A and 17B, another application of the present embodiment will be described. In the present application, let TB1, TB2 appearing periodically denote intervals where operation is carried out at the driving frequency f2, and TA denotes an interval appearing between the intervals TB1 and TB2 where operation is carried out at driving frequency f1. The interval TA is shortened by controlling the driving frequency f1 of the interval TA and the driving frequency f2 of the interval TB2, resulting in variation of the dimming level of the discharge lamp operation apparatus.

Referring now to FIGS. 17A and 17B, the present application will be described as follows.

In FIGS. 17A and 17B, the interval TA is divided into twenty-one intervals, and the interval TB2 is divided into four intervals. Four intervals in the interval TB2 are denoted by interval TB2(1), TB2(2), ..., TB2(4) (advance degree of phase satisfies TB2(1)<TB2(2) ... <TB2(4)), respectively.

According to the present application, when the frequency switching signal (b) is transmitted from the timer $3a$, the driving frequency of the interval TA(21) increases successively from f(1) to f(2), and then to f(3), and at the same time, the driving frequency of the interval TB2(4) decreases successively from f(9) to f(8), and then to f(7). The driving frequency of the interval TB1 is not controlled. Carrying out this control successively can shorten the interval TA, and can vary the dimming level. Similarly, the illuminance of the discharge lamp LA can be varied stepwise at a resolution sufficient to prevent human eyes from feeling flickering or changes in illuminance, and users can feel continuous variation in illuminance.

In this event, driving frequencies of the intervals TA(21) and TB2(4) may not be started to change simultaneously.

Operations, effects, etc. which have not been particularly stated in the above description are same as those stated in the embodiment mentioned above.

Third Embodiment

Figure 18:
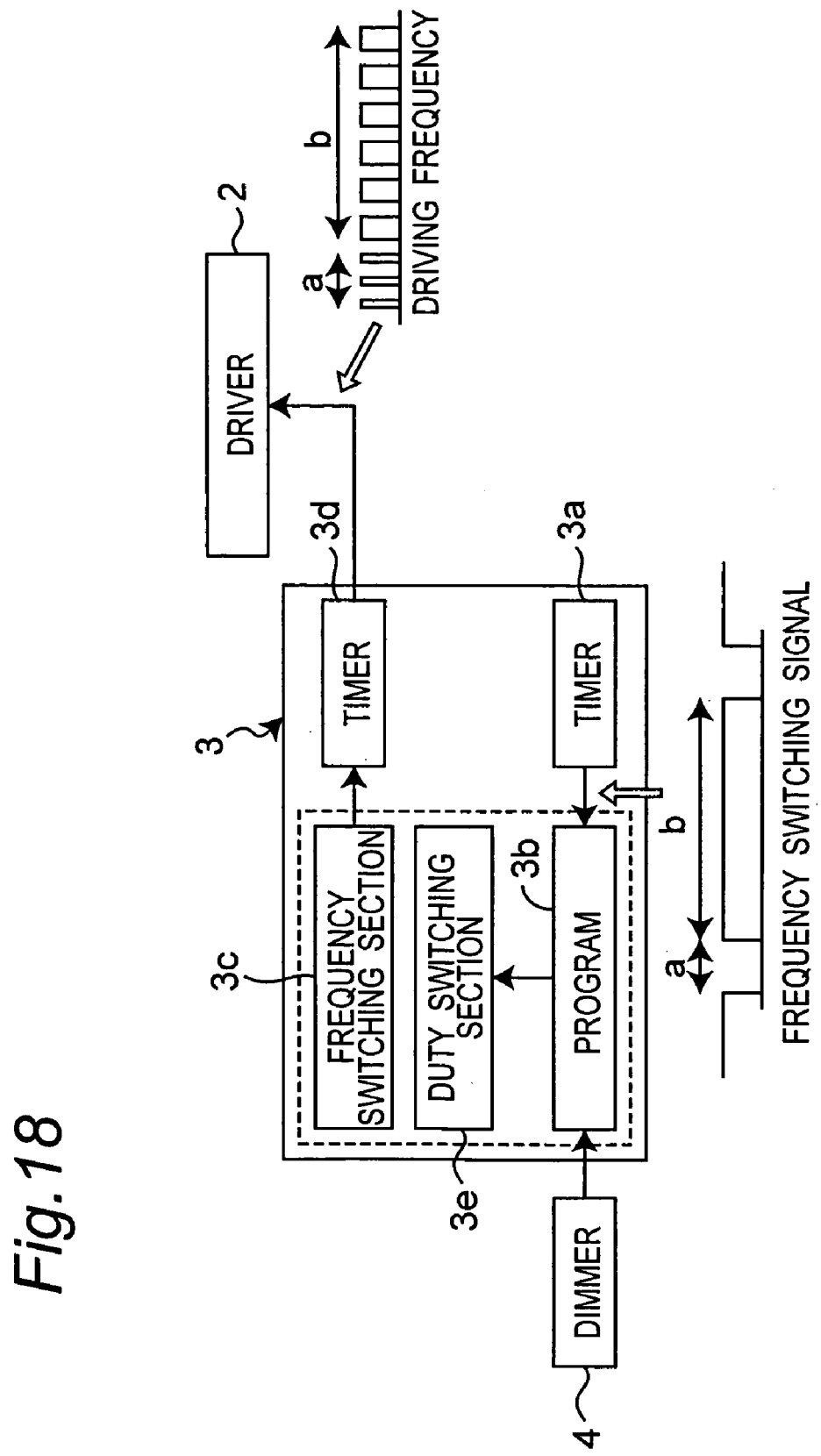
FIG. 18 shows another configuration of the pulse voltage superimposing section configured by a digital control means (third embodiment)
Figure 19:
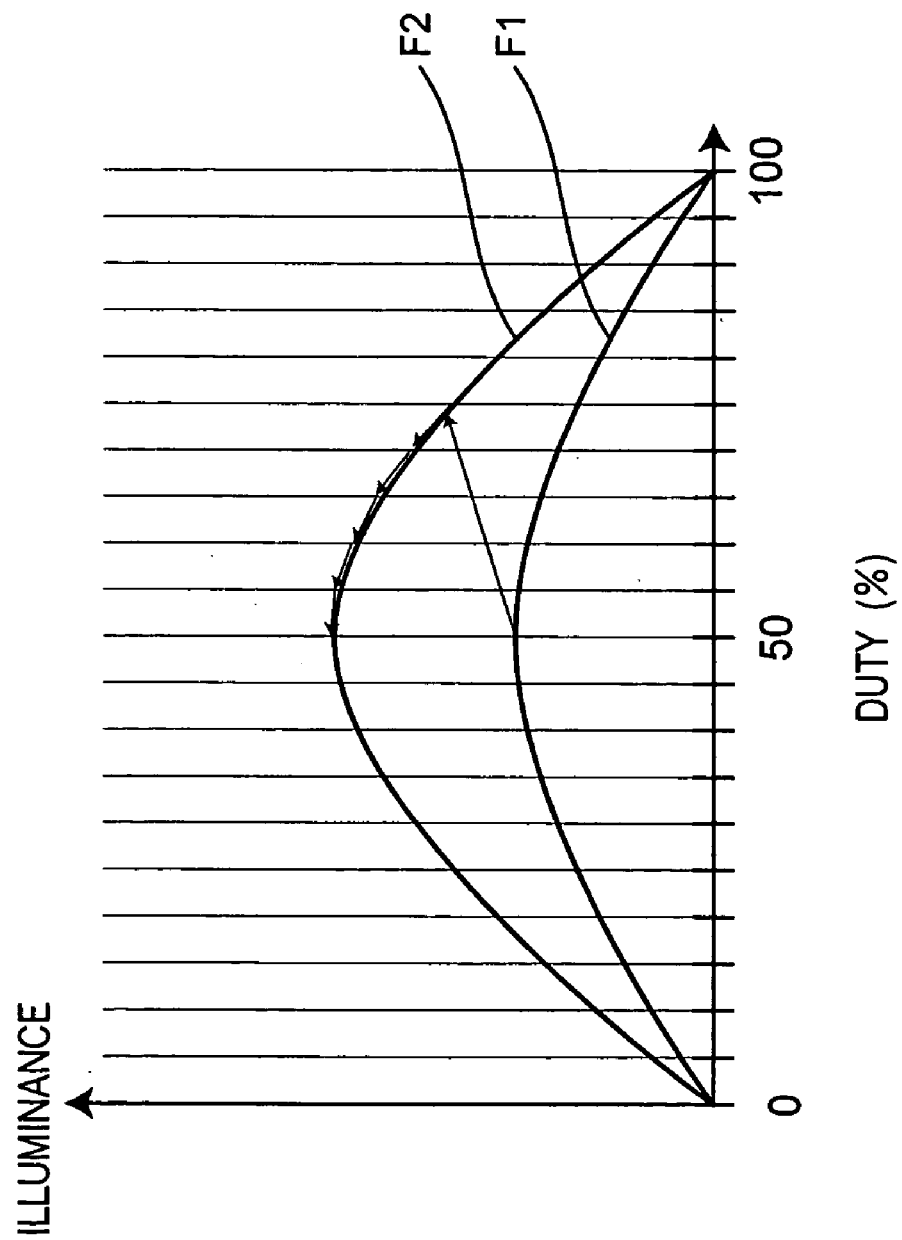
FIG. 19 is a block diagram showing the relationship between the duty of driving frequency and illuminance in order to describe the duty control of driving frequency in the third embodiment.

Referring now to FIG. 18 and FIG. 19, the third embodiment of the present invention will be described.

The pulse voltage superimposing section (digital controller) 3 shown in FIG. 18 is further equipped with a duty switching section $3e$ in addition to the configuration of the pulse voltage superimposing section 3 shown in FIG. 12. That is, in the present embodiment, the program $3b$ controls the duty, too, in addition to the driving frequency shown in the second embodiment, to vary the illuminance of the discharge lamp LA stepwise with more accurate and finer resolution. Now, the operation of the present embodiment will be described referring to FIG. 19.

Abscissa of FIG. 19 shows the duty. When the driving frequency is fixed, in general, the maximum illuminance is obtained when the duty is 50%. Ordinate shows illuminance of the discharge lamp LA. In addition, circular-arc curves F1 and F2 indicate the illuminance at the driving frequency f(1) and f(2). The driving frequency f(1) is greater than the driving frequency f(2).

Now, as is the case with the second embodiment, when the frequency switching signal (b) is transmitted from the timer 3a, the driving frequency of the interval TA(1) is varied from f(1) to f(2) based on the command of the program 3b. In the present embodiment, a control is carried out for temporarily increasing the duty from 50% by the duty switching section 3e simultaneously based on the command of program 3b when the driving frequency is varied from f(1) to f(2), and then returning the duty to 50% again when the driving frequency becomes f(2). In the case of FIG. 19, the duty is increased temporarily from 50% to 75%, and then, returned to 50% stepwise, and the driving frequency is varied from f(1) to f(2) in six steps. Carrying out this control can change the illuminance of the discharge lamp LA stepwise with more accurate and finer resolution. In the present embodiment, although the control for temporarily increasing the duty from 50% and returning to 50% again is carried out, the control for temporarily reducing the duty from 50% and returning again to 50% may be carried out. Carrying out this control can reduce the peak value of the pulse voltage without giving unpleasant feeling such as flickering, etc. to users.

Operations, effects, etc. which have not been particularly stated in the above description are same as those stated in the embodiment mentioned above.

Fourth Embodiment

Figure 20:
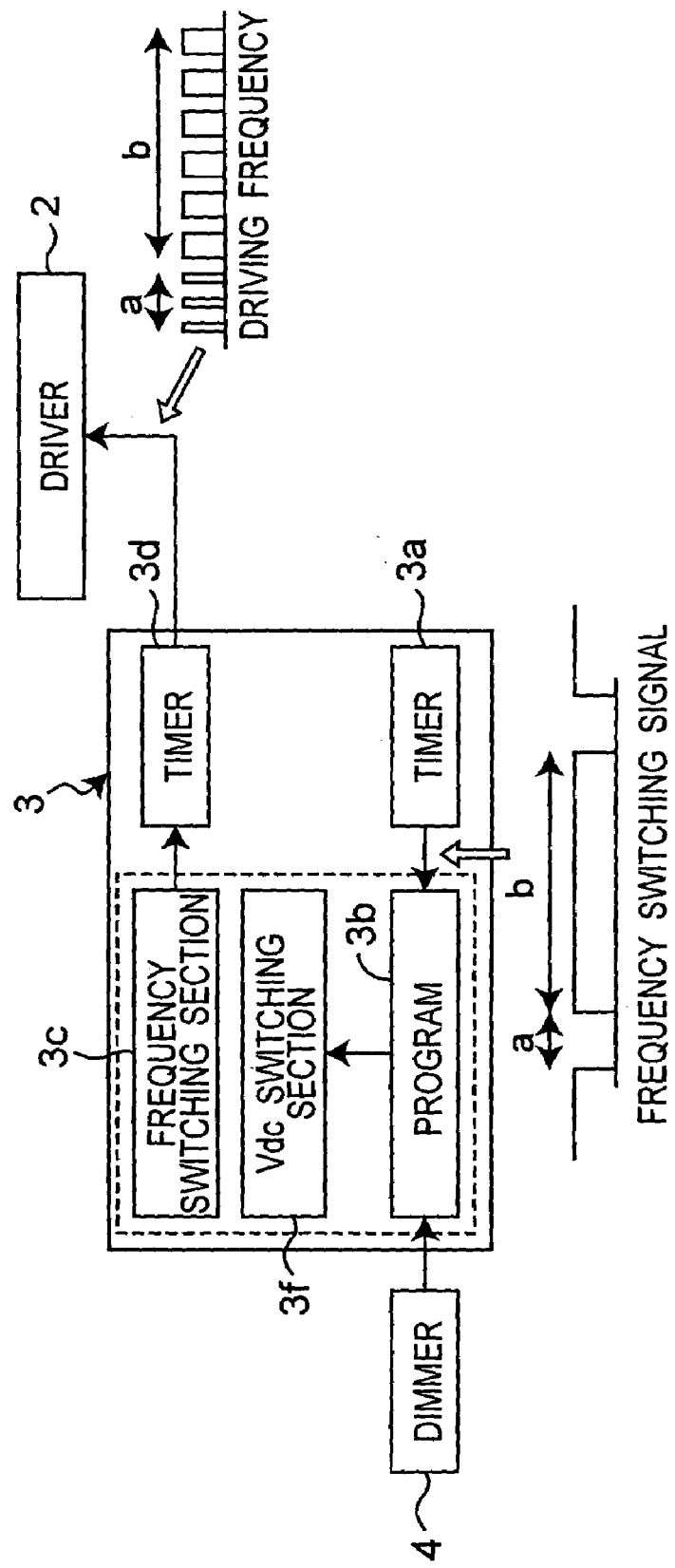
FIG. 20 shows still another configuration of the pulse voltage superimposing section configured by a digital control means (fourth embodiment)
Figure 21:
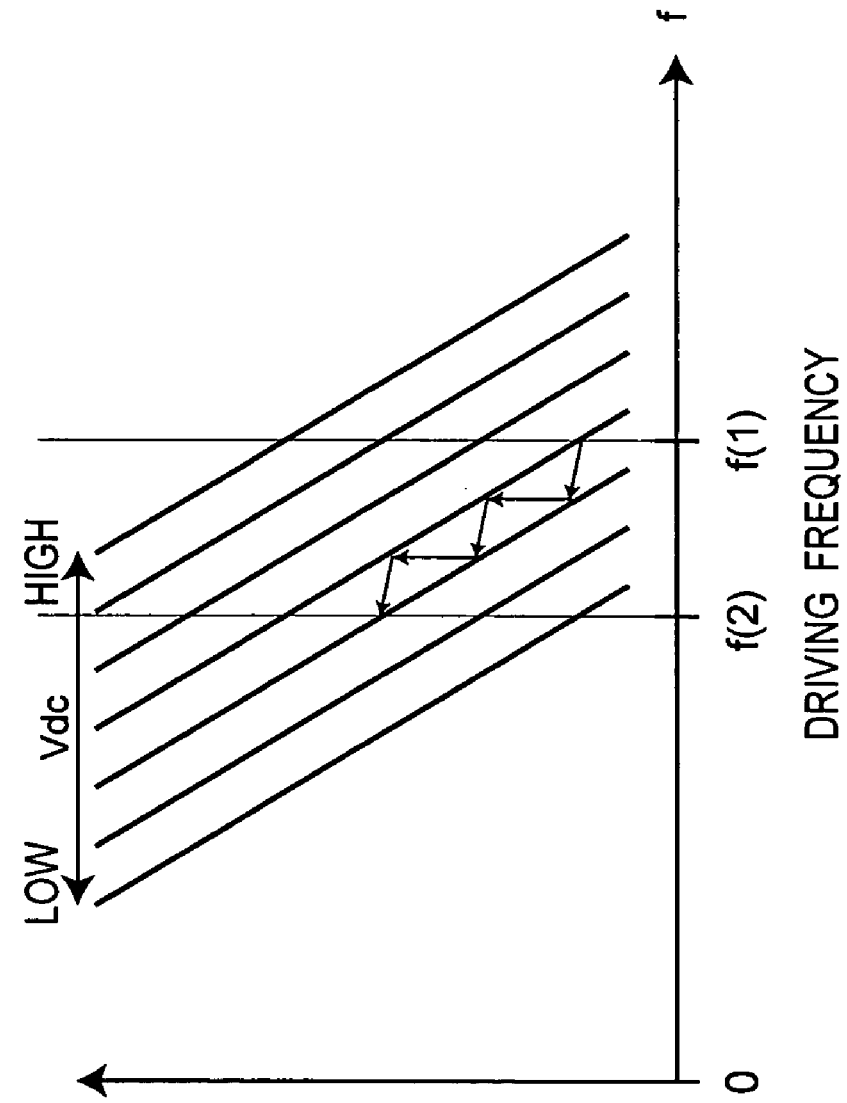
FIG. 21 is a diagram for explaining the driving frequency control and control of dc output voltage Vdc related to it in the fourth embodiment.
Figure 22:
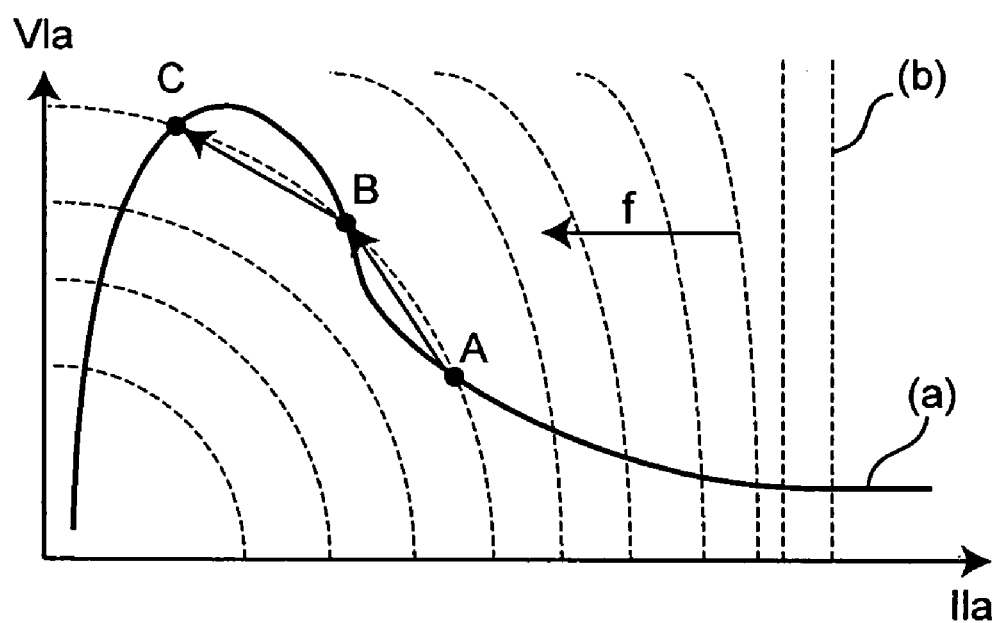
FIG. 22 is a diagram showing characteristics of discharge lamp LA (a) and output characteristics of discharge lamp operation apparatus (b) when operating frequency f of the inverter circuit is designated as a parameter.
Figure 23:
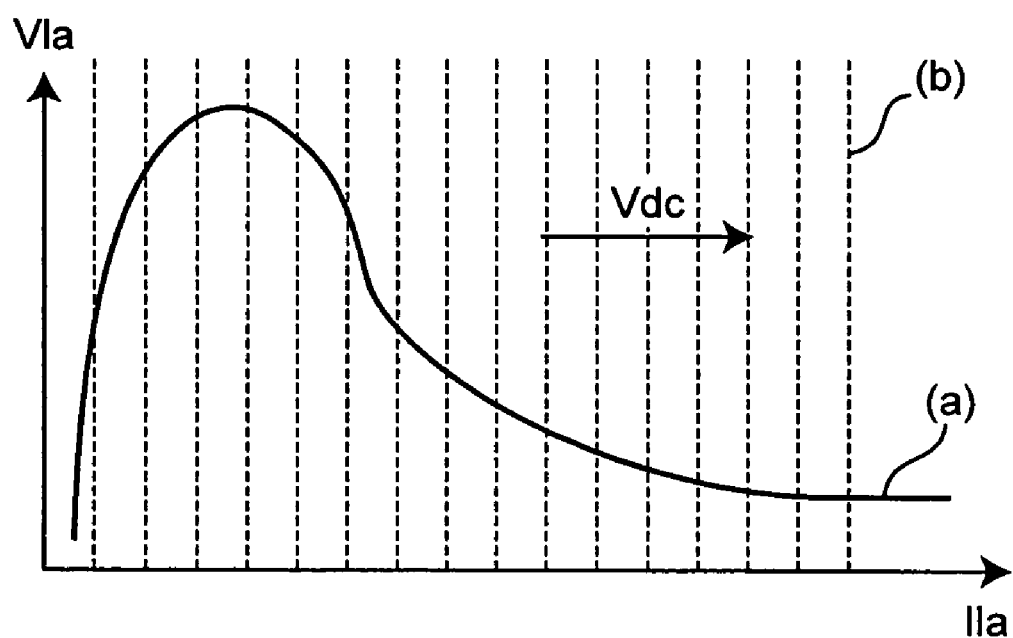
FIG. 23 is a diagram showing characteristics of discharge lamp LA (a) and output characteristics of discharge lamp operation apparatus (b) when output voltage Vdc of the chopper circuit is designated as a parameter.

Referring now to FIG. 20 and FIG. 21, the fourth embodiment of the present invention will be described.

The pulse voltage superimposing section 3 shown in FIG. 20 is further equipped with a Vdc switching section 3f in addition to the configuration shown in FIG. 12. That is, in the present embodiment, in addition to the control of the driving frequency shown in the second embodiment, the output voltage Vdc of the voltage converting circuit 11 shown in FIG. 12 is also controlled by the program 3b to vary illuminance of the discharge lamp LA thus to vary stepwise with more accurate and finer resolution.

Referring now to FIG. 21, the operation of the present embodiment will be discussed.

Abscissa of FIG. 21 shows the driving frequency f, while ordinate shows illuminance of the discharge lamp LA. In addition, diagonal lines show the output voltage Vdc of the voltage converting circuit 11.

Same as second and third embodiments, when the frequency switching signal (b) is transmitted from the timer 3a, based on the command of the program 3b, the driving frequency of the interval TA(1) is varied from f(1) to f(2). In the second embodiment, when the frequency switching signal (b) is transmitted from the timer 3a, the driving frequency of the interval TA(1) is varied from f(1) to f(2), the driving frequency is lowered, and the illuminance was raised. On the contrary, in the present embodiment, when the driving frequency is lowered from f(1) to f(2), based on the command of the program 3b, the Vdc switching section 3f reduces the output voltage Vdc of the voltage converting circuit 11 stepwise. In the example shown in FIG. 21, the driving frequency is varied from f(1) to f(2) in 5 steps. Carrying out this kind of control, the illuminance of the discharge lamp LA can be varied stepwise at more accurate and finer resolution, and the dimming level can be varied without giving unpleasant feeling to the user.

Conversely, when the peak value of the pulse voltage is reduced, no sooner than the driving frequency may be raised from f(2) to f(1), and the output voltage Vdc may be raised at the same time. By carrying out this kind of control, it becomes possible to vary the illuminance of the discharge lamp LA stepwise at more accurate and finer resolution, and to reduce the peak value of the pulse voltage without giving any unpleasant feeling to users.

The present invention has been described for specific embodiments, but for a person skilled in the art, many variations, modifications, and other applications are apparent. Consequently, the present invention shall not be limited to specific disclosures herein but shall be limited by the scope of claims attached.

The above disclosures relate to subjects included in Japanese patent applications, Japanese Patent Application. No. 2001-390734 (filed on Dec. 25, 2001), Japanese Patent Application. No. 2002-017783 (filed on Jan. 28, 2002), Japanese Patent Application. No. 2002-017789 (filed on Jan. 28, 2002), Japanese Patent. Application. No. 2001-390755 (filed on Dec. 25, 2001), contents of which are incorporated hereby by reference.

What is claimed is:

1. A discharge lamp operation apparatus, comprising:
   an AC power supply;
   a rectifying circuit that rectifies a voltage from the AC power supply;
   a voltage converting circuit that has at least one switching element and converts the output voltage from the rectifying circuit to a specified voltage;
   an inverter circuit that has at least one switching element and converts the output voltage of the voltage converting circuit to a high-frequency voltage;
   a load circuit that includes a discharge lamp and LC resonant circuit and is connected to the inverter circuit;
   a controller that drives the switching element included in the voltage converting circuit; and
   a driver that drives the switching element included in the inverter circuit at a specified driving frequency,
   wherein the controller varies the output voltage of the voltage converting circuit to carry out dimming control of the discharge lamp, and the operation apparatus further comprises a pulse voltage superimposing section that superimposes a pulse voltage to the voltage applied across the discharge lamp under the condition where the dimming control is carried out in the vicinity of a lower limit of a dimming ratio.

2. The discharge lamp operation apparatus according to claim 1 wherein the lower limit of the dimming ratio is 3% or lower.

3. The discharge lamp operation apparatus according to claim 1 further comprising an insulation transformer with a primary side coupled to the inverter circuit and a secondary side coupled to the load circuit.

4. The discharge lamp operation apparatus according to claim 1, wherein a period before the discharge lamp turns on is divided into a preheating period in which the discharge lamp is preheated and a startup period in which the discharge lamp is started, and during the startup period, the controller gradually increases the output voltage of the voltage converting circuit and at the same time the pulse voltage superimposing section superimposes the pulse voltage to the voltage applied to the discharge lamp.

5. The discharge lamp operation apparatus according to claim 4, wherein the pulse voltage superimposing section superimposes the pulse voltage to the voltage applied to the discharge lamp in the preheating period and the startup period.

6. The discharge lamp operation apparatus according to claim 1 wherein the pulse voltage superimposing section periodically superimposes the pulse voltage to the voltage applied to the discharge lamp.

7. The discharge lamp operation apparatus according to claim 4, wherein the controller gradually increases the output voltage of the voltage converting circuit from a value smaller than the peak value of a commercial power supply.

8. The discharge lamp operation apparatus according to claim 4, wherein the driving frequency during a specified period after the start of the preheating period is kept higher than the driving frequency during the remaining preheating period after the specified period.

9. The discharge lamp operation apparatus according to claim 4, wherein the pulse voltage superimposing section has a section that generates a pulse voltage by varying a switching frequency or duty of the switching element of the inverter circuit.

10. The discharge lamp operation apparatus according to claim 9, wherein a varying range of the driving frequency or the duty during the startup period is nearly constant.

11. The discharge lamp operation apparatus according to claim 4, wherein the driving frequency at the end of the preheating period is different from the driving frequency at the start of the startup period.

12. The discharge lamp operation apparatus according to claim 11, wherein the driving frequency at the end of the preheating period is lower than the driving frequency at the start of the startup period.

13. The discharge lamp operation apparatus according to claim 4, wherein the startup period is 100 msec or more.

14. The discharge lamp operation apparatus according to claim 1, wherein the pulse voltage superimposing section varies either the driving frequency or duty of the driver.

15. The discharge lamp operation apparatus according to claim 14, wherein the driver has a means that varies the switching frequency or duty of the switching element of the inverter circuit stepwise to generate a pulse voltage.

16. The discharge lamp operation apparatus according to claim 1, wherein the lower limit of the driving frequency is substantially equal to a resonance frequency of the LC resonance circuit.

17. The discharge lamp operation apparatus according to claim 1, wherein the pulse voltage superimposing section has a frequency switching section that periodically changes over the driving frequency of the driver from the first driving frequency f1 to the second driving frequency f2 which is lower than the first driving frequency, and varies the first driving frequency as the phase advances in the first interval TA where the discharge lamp is lighted at the first driving frequency.

18. The discharge lamp operation apparatus according to claim 17, wherein the pulse voltage superimposing section varies the second driving frequency as the phase advances in the second interval TB where the discharge lamp is lighted at the second driving frequency.

19. The discharge lamp operation apparatus according to claim 18, wherein, when the second interval TB is divided into a plurality of small intervals TB(1) through TB(m) (m: natural number) and the driving frequency which varies stepwise is designated as $f(1)$ ($f2 \leq f(1) \leq f1$), the pulse voltage superimposing section varies the driving frequency in each small interval from the frequency f2 to the frequency f(1) while it is moving from small interval TB(1) to TB(m) successively, and when the driving frequency of all small intervals from small interval TB(1) to TB(m) becomes the driving frequency f(1), the pulse voltage superimposing section varies the driving frequency from f(1) to f(l+1) (second frequency $f2 \leq$ driving frequency $f(1) \leq$ driving frequency $f(l+1) \leq$ first frequency f1) while it further moves from small interval TB(1) to TB(m) successively,.

20. The discharge lamp operation apparatus according to claim 17, wherein, when the first interval TA is divided into a plurality of small intervals TA(1) through TA(n) (n: natural number) and the driving frequency which varies stepwise is designated as $f(k)$ (second frequency $f2 \leq$ driving frequency $f(k) \leq$ first frequency f1), the pulse voltage superimposing section varies the driving frequency in each small interval from the driving frequency f1 to the driving frequency f(k) (k is 2 or larger natural number) while it is moving from small interval TA(1) to TA(n) successively, and when the driving frequency of all small intervals from small interval TA(1) to TA(n) becomes the driving frequency f(k), the pulse voltage superimposing section varies the driving frequency from f(k) to f(k−1) (second frequency $f2 \leq$ driving frequency $f(k-1) \leq$ driving frequency $f(k) \leq$ first frequency f1) while it further moves from small interval TA(1) to TA(n) successively.

21. The discharge lamp operation apparatus according to claim 17, wherein the first interval TA is divided into a plurality of small intervals TA(1) through TA(n) (n is a natural number), and the pulse voltage superimposing section varies the driving frequency of each small interval TA(2) through interval TA(n) successively from the first frequency f1 to the second frequency f2 after the driving frequency of small interval TA(1) changes from the first frequency f1 to the second frequency f2.

22. The discharge lamp operation apparatus according to claim 1, wherein the pulse voltage superimposing section has a frequency switching section operable to periodically change over the driving frequency of the driver from the first driving frequency f1 to the second driving frequency f2 lower than the first driving frequency, and wherein the interval TB1 to be operated at the second driving frequency f2 periodically generated and the interval TB2 located after the interval TB1 to be operated at the second driving frequency f2 periodically generated are provided, and when the interval TA located between the intervals TB1 and TB2 is operated at the driving frequency f1, the driving frequency f1 of the interval TA and the driving frequency f2 of the interval TB2 are controlled to reduce the interval TA.

23. The discharge lamp operation apparatus according to claim 22, wherein, when the interval TA is divided into a plurality of small intervals TA(1) through TA(n) (n is a natural number) and the interval TB2 is divided into a plurality of small intervals TB2(1) through TB2(m) (m is a natural number), the driving frequency of the small interval TA(n) is changed from the driving frequency f1 to the driving frequency f2 and at the same time the driving frequency of the small interval TB2(m) is changed from the driving frequency f2 to the driving frequency f1.

24. The discharge lamp operation apparatus according to claim 17, wherein the pulse voltage superimposing section has a duty switching section that changes over the duty of the switching element of the inverter circuit, and the duty switching section controls the duty to cancel the illuminance variation of the discharge lamp due to a change in the driving frequency.

25. The discharge lamp operation apparatus according to claim 24 wherein the duty switching section carries out the control to lower the driving frequency and at the same time to increase or decrease the duty from 50%.

26. The discharge lamp operation apparatus according to claim 24 wherein the duty switching section carries out the control to raise the driving frequency and at the same time to bring the duty close to 50%.

27. The discharge lamp operation apparatus according to claim 17, wherein the pulse voltage superimposing section further includes an output voltage switching section that changes over the output voltage of the voltage converting circuit, and the output voltage switching section carries out control to make the increase/decrease direction of the driving frequency of the driver into equal to the increase/decrease direction of the output voltage of the voltage converting circuit.

28. The discharge lamp operation apparatus according to claim 27, wherein the output voltage switching means carries out the control to lower the driving frequency while decreasing the output voltage, or to raise the driving frequency while increasing the output voltage.

29. The discharge lamp operation apparatus according to claim 6, wherein the controller gradually increases the output voltage of the voltage converting circuit from a value smaller than the peak value of a commercial power supply.

30. The discharge lamp operation apparatus according to claim 22, wherein the pulse voltage superimposing section has a duty switching section that changes over the duty of the switching element of the inverter circuit, and the duty switching section controls the duty to cancel the illuminance variation of the discharge lamp due to a change in the driving frequency.

31. The discharge lamp operation apparatus according to claim 22, wherein the pulse voltage superimposing section further includes an output voltage switching section that changes over the output voltage of the voltage converting circuit, and the output voltage switching section carries out control to make the increase/decrease direction of the driving frequency of the driver into equal to the increase/decrease direction of the output voltage of the voltage converting circuit.

* * * * *